(12) United States Patent
Chen et al.

(10) Patent No.: US 7,572,750 B2
(45) Date of Patent: Aug. 11, 2009

(54) CATALYSTS AND PROCESSES FOR THEIR PREPARATION

(75) Inventors: Jun Chen, North Wollongong (AU); Gerhard F. Swiegers, Vermont (AU); Chee O. Too, Farmborough Heights (AU); Gordon G. Wallace, North Wollongong (AU)

(73) Assignee: University of Wollongong, New South Wales (AU)

( * ) Notice: Subject to any disclaimer, the term of this patent is extended or adjusted under 35 U.S.C. 154(b) by 0 days.

(21) Appl. No.: 10/504,167

(22) PCT Filed: Feb. 11, 2003

(86) PCT No.: PCT/AU03/00143

§ 371 (c)(1),
(2), (4) Date: Mar. 18, 2005

(87) PCT Pub. No.: WO03/068392

PCT Pub. Date: Aug. 21, 2003

(65) Prior Publication Data

US 2005/0164297 A1    Jul. 28, 2005

(30) Foreign Application Priority Data

Feb. 11, 2002    (AU) ........................... PS0445

(51) Int. Cl.
B01J 31/00    (2006.01)
B01J 37/00    (2006.01)
B01J 21/00    (2006.01)
C08F 4/02    (2006.01)
C08F 4/60    (2006.01)

(52) U.S. Cl. .................. 502/102; 502/152; 502/253

(58) Field of Classification Search ............ 204/290.11, 204/290.14, 403.01–403.15, 636–638; 502/159, 502/164, 167, 102, 150, 523; 548/402; 429/40–46; 436/19; 205/775

See application file for complete search history.

(56) References Cited

U.S. PATENT DOCUMENTS

| | | | | | |
|---|---|---|---|---|---|
| 3,925,410 | A | * | 12/1975 | Van Landuyt et al. | 548/402 |
| 5,082,539 | A | * | 1/1992 | Saji et al. | 205/162 |
| 5,212,311 | A | * | 5/1993 | Watanabe et al. | 546/11 |
| 5,262,035 | A | * | 11/1993 | Gregg et al. | 204/403.11 |
| 5,938,917 | A | * | 8/1999 | Mulchandani | 205/777.5 |
| 6,191,284 | B1 | * | 2/2001 | Knochel et al. | 548/402 |
| 6,534,657 | B2 | * | 3/2003 | Zhang | 548/101 |
| 7,074,308 | B2 | * | 7/2006 | Mao et al. | 204/403.14 |

OTHER PUBLICATIONS

J. Electroanal.Chem., (1980) 110 Bettelheim A. et al., "Electroanalysis Of Oxygen Reduction Part III. Selective Reduction To Hydrogen Peroxide Or Water Using Polymeric Attachment Of Metalloporphyrins", pp. 93-102.

J. Electroanal.Chem., (1977) 77 Brezina M. et al., "Electroreductin Of Oxygen And Hydrogen Peroxide Catalyzed by Hemine And Phthalocyanines", pp. 237-244.

J. Electroanal. Chem., (1985) 196 Zecevic S. et al., "Spectroscopic And Electrochemical Studies Of Transition Metal Tetrasulfonated Phthalocyanines", pp. 339-358.

Transition Met. Chem., (1990) 15 Vasudevan P. et al., "Transition Metal Complexes Of Porphyrins And Phthalocyanines As Electrocatalysts For Dioxygen Reduction", pp. 81-90.

J. Phys. Chem. B, (1977) 101 Masayuki Yagi et al., "Cooperative Catalysis And Critical Decomposition Distances Between Molecular Water Oxidation Catalysts Incorporated In A Polymer Membrane", pp. 5143-5146.

J. Phys. Chem. B, (1999) 103 Masayuki Yagi et al., "Cooperative Catalysis And Critical Decomposition Distances In Water Oxidation By The Mononuclear Amineruthenium (111) Complex In A Nafion Membrane", pp. 2151-2154.

Chem. Rev., (2001) 101 Masao Kaneko and Masayuki Yagi, "Molecular Catalysts For Water Oxidation", pp. 21-35.

Submitted for publication—Chen G.F. et al. "Towards A Unified, General Theory Of Enzymatic Catalysis. An Organometallic Catalyst Elucidates The Underlying Principles Of Enzymatic Catalysis", Chen et al.

Chem. Commun., (2004) Chen G.F. et al., "A Readily-prepared Electrocatalytic Coating That Is More Active Than Platinum For Hydrogen Generation In 1 M Strong Acid", pp. 308-309.

Submitted for Publication—Chen et al, "Enzymatic Catalysis is a Statistical—Kinetic Phenomenon that is Fully Defined by a Single, Key Attribute", pp. 1-10 (Mar. 2005)—Document (A).

Submitted for Publication—Swiegers et al, "Non-Biological, Multi-Centred Molecular Catalysis. The Conceptual Overlap of Enzymatic Catalysis, Biomimetic Chemistry, and Homogeneous Catalysis"—Document (B).

Journal Of The Chemical Society, Faraday Transactions (1996), 92(13), Masayuki Yagi et al, "Activity Analysis Of A Water Oxidation Catalyst Immobilised In A Polymer Member" pp. 2457-2461.

Journal Of The Electrochemical Society (1990), 137(3) Jiang S P et al, "Homogeneous And Heterogenous Catalytic Reactions In Cobalt Oxide/Graphite Air Electrodes" pp. 764-769.

Journal Of Molecular Catalysis A: Chemical (2000), 151 (1-2), Masuki Yagi et al, Cooperative Catalysis And Critical Decomposition distances In Water Oxidation By Tris (ethylenediamin) ruthenium (III) Complex Confined In A Nation Membrane pp. 29-35.

(Continued)

Primary Examiner—Jerry Lorengo
Assistant Examiner—James E McDonough
(74) Attorney, Agent, or Firm—Sughrue Mion, PLLC

(57) ABSTRACT

A hybrid homogeneous-heterogeneous catalyst containing catalytic groups, wherein the catalytic activity of the catalyst is largely provided as a result of the interaction of catalytic groups in a suitable proximity and disposition to other catalytic groups, the proximity and disposition resulting from statistical considerations, wherein an example of such catalyst is a polypyrrole-ferrocene monosulfate represented by Formula IV.

13 Claims, 10 Drawing Sheets

OTHER PUBLICATIONS

Figure 1:
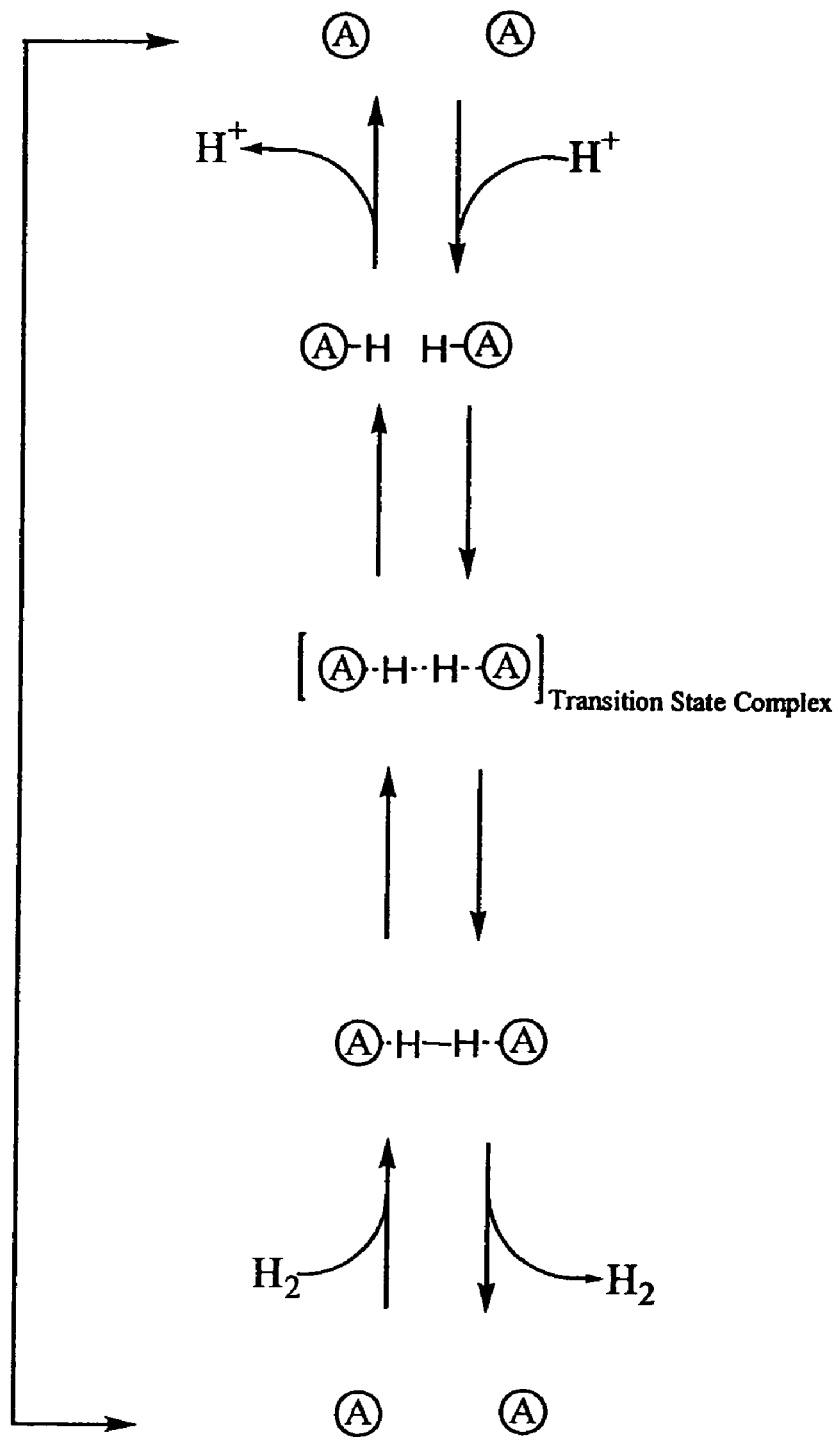

Biosensors & Bioelectronic (1999), 14(2), Okawa Y., "Tethered Mediator Biosensor. Mediated Electron Transfer Between Redox Enzyme And Electrode Via Ferrocene Anchored To Electrode Surface With Long Poly(oxyethylene)", pp. 229-235.

Swiegers, "Temporal Catalysis. The Conceptual Unification of Heterogeneous, Homogenous, and Enzymatic Catalysis: Essays on the Catalytic Action of Enzymes and its Mimicry.", CSIRO Molecular And Health Technologies, Melbourne, Australia, pp. 1-107 (2006).

Submitted for Publication—Chen et al, "Enzymatic Catalysis is a Statistical—Kinetic Phenomenon that is Fully Defined by a Single, Key Attribute", pp. 1-10 (Mar. 2005)—Document (A).

* cited by examiner

CATALYSTS AND PROCESSES FOR THEIR PREPARATION

This application is a 371 of PCT/AU 03/00143, filed Feb. 11, 2003; the disclosure of which is incorporated herein by reference.

FIELD OF THE INVENTION

This invention relates to a new class of catalyst, and methods for the identification and generation of these catalysts. A new type of catalyst for the electrochemical generation of hydrogen from acidic aqueous solutions is also described.

BACKGROUND OF THE INVENTION

Catalysts can be broadly characterised in three broad types, heterogeneous catalysts, homogeneous catalysts and hybrid homogeneous-heterogeneous catalysts. Heterogeneous catalysts act by catalysing a reaction at the boundary of two phases (e.g. a solid-liquid boundary). Homogeneous catalysts act by catalysing a reaction within the same phase as the reactants (e.g. both reagents and catalyst are dissolved in a liquid phase). Hybrid Homogeneous-Heterogeneous catalysts involve a homogeneous catalyst anchored to a supporting material. The resulting catalyst can be considered heterogeneous (from an engineering point of view) or homogeneous (from a chemical point of view).

Classical heterogeneous catalysts can be considered to include (i) bulk metal (e.g. a platinum mesh), (ii) metal oxides, sulphides, or carbides (e.g. iron oxide pellets), (iii) solid acids or bases (e.g. zeolites), (iv) supported metals (e.g. platinum on a silica support) and (v) alloys or discrete two-metal combinations (e.g. microscopic islands of ruthenium on a platinum base).

These catalysts are heterogeneous as catalysis occurs at a boundary between two phases such as the metal surface of the catalyst and a liquid or gaseous phase containing the reactant. The dominant interaction between catalyst and reagent during the catalytic process is adsorption. The catalyst consists of bulk (large) agglomerations of atoms connected to each other by metallic bonds or ionic bonds. The catalyst is a metallic or an ionic solid. Generally the catalyst is "multi-site", that is it has many adsorption sites having different properties on the catalyst surface. Typically, the same type of atoms constitutes the adsorption sites, but the surface morphology of the catalyst affects the catalytic properties and outcome.

Most modern industrial catalytic processes involve this type of catalyst, usually in the form of metal or metal oxide plates, gauzes, or pellets which are placed in contact with reagent streams. In such systems, molecules of the reagents are constantly adsorbing onto the catalyst surface and then desorbing from it. If reagent molecules are adventitiously proximate and favourably disposed upon the surface following an adsorption process, their reaction with each other is facilitated and catalysed. If they are not, it is not. High temperatures and pressures, and the use of optimal catalyst materials and material structures are typically employed to increase the statistical likelihood of a successful encounter between reagent molecules on the catalyst surface. An important drawback of such catalysts is that they are usually unselective in their adsorption, meaning that chemical impurities in the feedstock streams also adsorb onto the catalyst surface. If these impurities do not desorb—as many do not—that site on the catalyst surface is poisoned. The multi-site nature of these catalysts can result in a mixture of products as a result of the different catalytic properties of the sites. However, despite these deficiencies such catalysts can and do provide an economic means for the manufacture desired products or for processing of reagents in an industrial setting. They are typically easy to separate from the end product by virtue of being in a solid phase and are often suitable for use in continuous manufacturing processes.

In contrast homogeneous catalysts involve reactions within a single phase by a molecular entity containing a catalytic group. Homogeneous catalysts can be considered to include classical homogeneous catalysts, biological catalysts and biomimetic catalysts.

Classical homogeneous catalyst includes (i) soluble acids and bases (e.g. HF), (ii) metal salts or metal complexes (e.g. Wilkinsons catalyst, Heck catalysts, metallocene catalysts), (iii) Radical initiators (e.g. benzoyl peroxide), (iv) certain solvents (e.g. dimethylformamide).

In all such systems there is no support or supporting substrate with the catalysis occurring in a single phase (typically within solution). The catalytic groups generally act in isolation from each other at the molecular level (i.e. normally "single-site"), i.e. they involve one catalytic group only. Typically the reagents bind to a single atom of the catalytic group (e.g. the metal atom in metallocene catalysts). These single site catalysts may also be referred to as mononuclear catalysts. In the rarer cases where the catalytic groups do not act in isolation (i.e. when two or more different catalytic groups are necessary), their proximity to each other during the catalytic process is not crucial. The intermediates formed with the catalytic groups are typically fairly stable.

Biological catalysts are enzymes per se and the catalysis occurs in a single phase in solution making it a homogeneous process. The enzymes do not use a support or supporting substrate. Biological catalysts exhibit a power and specificity which far exceeds the capacity of modern industrial catalysts. For example, one molecule of the enzyme carbonic anhydrase, which is one of the most active catalyst known, converts, on average, 100,000 carbon dioxide molecules each second (in our muscles) into aqueous carbonic acid (in our blood stream). It does this without fail, at body temperature and at a pressure less than 1 atmosphere. Moreover, it does this selectively in the presence of a wide variety of other possible reagents without becoming deactivated. By comparison, a typical modern industrial catalyst, such as the heterogeneous catalytic system of solid iron and oxide mix used in the important Haber-Bosch process for the production of ammonia from nitrogen and hydrogen, typically requires temperatures of 500° C. with the reagent gases compressed to 1,000 atmospheres of pressure. Even so, only 15-25% of the reagents typically convert to ammonia. The catalyst must also be periodically replaced because it is slowly rendered inactive by the presence of impurities in the reagent streams.

The origin of enzymatic activity and specificity has been the subject of numerous scientific studies. It is now generally agreed by practitioners of the art that enzymes perform as efficiently as they do because of two important properties:

(a) Proximate Binding: The active sites of many enzymes contain an arrangement of atoms which bind reagent molecules and hold them in close proximity and in favourable dispositions to each other. It does so by containing catalytic groups covalently bound to supporting structure having a particular configuration determined by intramolecular interactions between various atoms or groups within the structure. This proximity greatly facilitates reactions between the reagents by stabilising the required transition states. In so doing, the rate of the reaction may be increased by many orders of magnitude compared to the rate of the same reaction in the absence of the enzyme.

(b) "Lock-and-Key" Binding: The active sites of many enzymes only bind reagents whose shape and chemical properties are complementary. This "lock-and-key" interaction prevents the attachment of unwanted reagents which could temporarily or permanently block the active site. A reagent which permanently blocks the active site of a catalyst is said to "poison" the catalyst.

A key challenge in chemistry has been the design and preparation of artificial catalytic systems which mimic the action of enzymes either in principle or in practice. Such catalysts are known as biomimetic catalysts. They are homogenous catalysts in that they operate in a single phase. Such systems are also known as Artificial Enzymes, a term defined in the scientific article "Biomimetic Chemistry and Artificial Enzymes—Catalysis by Design" by R. Breslow in *Accounts of Chemical Research* (1995), Volume 28, pages 146-153. Two approaches have been largely employed to develop biomimetic catalysts by practitioners of the art:

(i) studying and elucidating the atomic structure of an enzyme's active site and then replicating it in an artificially constructed molecule.

(ii) constructing molecules containing, in close proximity to each other, atoms or units of atoms which are known to bind and stabilise reagents in a state conducive to reaction. These catalytic groups are different to those in the corresponding enzyme, but are known to be capable of performing similar functions.

The molecules developed using approaches (i) and (ii) above rely on the proximity and disposition of catalytic groups to each other to bring about the catalysis. As is the case with enzymes, the catalytic groups are generally not individually catalytically active, but are transformed into highly active catalysts when in the correct proximity and disposition to other catalytic groups. This proximity is created in biomimetic catalysts of this type by covalently or coordinately binding the catalytic groups to the same molecular backbone or framework.

While certain molecules constructed using these strategies have been shown to produce catalytic properties similar to those of a corresponding enzyme, both of the above approaches have significant disadvantages:

(A) they require the chemical synthesis of often highly complicated molecules in which the catalytic groups (atoms or units of atoms) must be held in precise dispositions and proximities by covalent bonds between the catalytic groups. The exactness required in these parameters typically necessitates complicated synthetic chemical procedures which are labour intensive and expensive to perform.

(B) the artificial catalysts prepared in these approaches are discrete molecular units which must operate in open solution in the same way that enzymes do. This is not preferable from a manufacturing point of view because:

1. In many cases, the molecular scale of the catalysts makes them difficult to separate from the products they generate. This renders them unsuitable for continuous chemical manufacturing processes.

2. Catalysts which need to be continuously regenerated during their operation must be separately cycled to maintain their catalytic properties during continuous chemical manufacturing processes. This usually requires operating a separate set of "sacrificial" reagents in parallel to the manufacturing process.

An example of the above difficulties is the catalytic conversion of protons ($H^+$) such as present in acid, to hydrogen ($H_2$). Hydrogen gas is an important energy-efficient and environmentally-friendly fuel which can, however, not be efficiently stored in the form of a gas. Its ready production, on demand, from acids by an economically feasible process therefore offers considerable opportunities. The reverse process, which involves the electrochemical conversion of hydrogen gas to acids, is additionally a convenient source of electrical energy which can be used to power electrical appliances. Naturally-occurring hydrogenase enzymes are efficient catalysts for converting acids ($H^+$) to hydrogen gas, and the reverse process.

Several highly efficient artificial catalysts which mimic in principle or practice the mechanism of certain of the hydrogenase enzymes for the conversion of $H^+$ to $H_2$ have been discovered in recent years, with the compounds known as [1.1]ferrocenophanes emerging as amongst the most successful. In these complexes two ferrocene units are held in close and controlled proximity to each other by the presence of bridging methyl groups. This proximity (Fe . . . Fe distance=3.4-4.8 angstroms during twisting) facilitates a stabilizing interaction between two iron-bound $H^+$ species which are present on each ferrocene when they are protonated. In acid solution, these $H^+$ ions are therefore spontaneously converted to $H_2$ and released by the ferrocenophanes which are themselves converted to di-ferrocenium ions in the process. The addition of a sacrificial reductant, such as lead, converts the di-ferrocenium ions back to [1.1]ferrocenophanes, thereby closing the catalytic cycle and allowing a continuous production of $H_2$.

The problems associated with the commercial operation of these processes include the need to prepare the [1.1]ferrocenophanes by complicated synthetic procedures, the need to use strongly acidic solutions, and the difficulty of employing them in processes on a commercial scale. There is also a need for a sacrificial reductant.

Hybrid homogeneous-heterogeneous catalysts can provide a mixture of the advantages and disadvantages of homogeneous and heterogeneous catalysts, and thereby a partial solution to some of these problems. In particular, they offer the prospect of combining the advantages of homogeneous catalysts (greater selectivity and reproducibility in the catalysis, mild reaction conditions, ready chemical modification, and greater inherent efficiency) with the advantages of heterogeneous catalysts (ready incorporation in new and existing industrial processes, general ease of use) in a design which is inherently biomimetic.

The field of hybrid homogeneous-heterogeneous catalysts can be considered to include (i) immobilised classical homogeneous catalysts (e.g. Wilkinsons catalyst bound a polystyrene support), (ii) immobilised enzymes (e.g. an enzyme bound to a supporting substrate), (iii) biomimetic catalysts immobilised on the surface of a support or supporting substrate (e.g. [1.1]ferrocenophane bound to the surface of a support), and (iv) polymer-bound species which become catalytic groups only when in close proximity to each other.

These catalysts are typically associated with a supporting substrate by adsorption or by trapping of the catalyst on the substrate or by covalently binding or ion-paring one or more of the catalytic groups to a polymer backbone, where the polymer is anchored to a substrate. The catalytic activity of such hybrid heterogeneous-homogeneous catalysts are governed by a wide range of factors including the ability of the support to; (I) inhibit deactivation processes, (II) promote coordinative unsaturation of the metal atoms/ions in the catalytic groups, thereby speeding up the reaction, (III) improve the selectivity of the catalysis, with an accompanying improvement in the product properties, (IV) retain the catalytic groups strongly, allowing maximum product generation by the catalyst, and, as a consequence of the above factors, (V) allow cooperative multi-step catalysis in which the product of one step is consumed in the next.

One of the problems with using adsorption or trapping the catalyst to a support substrate is the generally poor durability of the catalyst. The use of ion pairing provides better durability but the polymer backbone is typically expensive to manufacture. The use of covalent bonding to anchor the catalytic groups to the polymer backbone significantly increases the manufacturing cost of this type of catalyst and it is believed that no such catalysts are being used in large scale in industry. This is unfortunate since locating suitable catalytic groups in close proximity to each other on a supported hybrid heterogeneous-homogeneous catalyst provides a prospectively useful means of mimicking biological catalysts in either principle or practice.

Thus there is a need for catalysts which mimic the action of biological catalysts whilst avoiding the manufacturing costs associated with such catalysts. Ideally, the catalysts would be capable of being used in continuous manufacturing processes and would therefore be of a hybrid heterogeneous-homogeneous type. To minimise the costs of such hybrid heterogeneous-homogeneous catalysts, it is desirable that a cheap support be used, along with a cheap method of incorporating the catalytic groups into or onto the support.

SUMMARY OF THE INVENTION

The present invention is predicated on the discovery of a new type of hybrid homogeneous-heterogeneous catalyst, hereafter referred to as Statistical Proximity catalysts. Their catalytic activity is governed by statistical considerations and not merely the activity of the catalytic groups per se or by the incorporation of the catalytic groups within a single molecule or backbone in order to locate the two (or more) catalytic groups in a catalytic active configuration. In other words, the catalytic activity is provided adventitiously by locating sufficient numbers of catalytic groups on a substrate so as to thereby locate at least some of the catalytic groups in suitable proximity and suitable disposition relative to other catalytic groups so as to facilitate the reaction of one or more reagents under catalytic conditions.

Accordingly, in an aspect of the invention, and not necessarily the broadest aspect, there is provided a hybrid homogeneous-heterogeneous catalyst containing catalytic groups, wherein the catalytic activity of the catalyst is largely provided as a result of the interaction of catalytic groups in a suitable proximity and disposition to other catalytic groups, the proximity and disposition resulting from statistical considerations.

In another aspect of the invention, there is provided a hybrid homogeneous-heterogeneous catalyst formed by locating adequate numbers of catalytic groups in a discrete volume so as to thereby locate a sufficient number of catalytic groups at a suitable distance and disposition relative to other catalytic groups so as to facilitate the reaction of one or more reagents.

In another aspect of the invention, there is provided a catalyst involving multiple different catalytic groups for facilitating the reaction of one or more reagents, prepared by locating adequate numbers of compounds containing at least one catalytic group in a discrete volume so that sufficient numbers of the catalytic groups located in different compounds are positioned at a suitable distance and in a suitable disposition relative to each other to facilitate the reaction of one or more reagents.

Preferably each of the catalytic groups are incorporated within separate compounds on a support structure, such as a porous framework.

Another aspect of the invention is a catalyst characterised by the property that when only the concentration of its catalytic groups within a discrete volume is increased by a factor X, the catalytic activity or selectivity of the catalyst is increased by a factor Y, where Y is greater than X. The catalyst may also be characterised by the property that its catalytic activity at a constant concentration M, is increased by a factor X, X being greater than 1, upon the application of new conditions which cause a change in the statistical distribution of catalytic groups and thereby the proximities between the catalytic groups. Such changed conditions include, but are not limited to physical changes, such as new temperatures, acidities, polarities, solvents, or solutes, or the establishment of new supramolecular interactions between the catalytic groups or compounds or compounds residues containing the catalytic groups.

Another aspect of the invention is a catalyst formed from compounds that in dilute solution or under unfavourable physical or supramolecular conditions have no or little significant catalytic activity, but when incorporated at a sufficient concentration on a support, preferably a porous support, or under favourable physical or supramolecular conditions have substantial catalytic activity.

In another aspect of the invention there are provided test methods for identifying statistical proximity catalysts or statistical proximity effects in catalysts. In an aspect of the invention there is provided an assay for determining whether a statistical proximity effect is influencing catalytic activity of a test catalyst by using kinetic studies to determine whether:—
  (i) the observed catalysis occurs as a result of the interaction of one or more types of catalytic groups with a reagent or intermediate; and whether
  (ii) the mechanism of catalysis involves a simultaneous interaction of two or more separate catalytic groups with a reagent or intermediate; and whether
  (iii) the interaction of two or more separate catalytic groups with a reagent or intermediate occurs when the catalyst is formed or used under conditions which favourably influence the statistical distribution of proximities between the catalytic groups involved.

A preferred means of favourably influencing the statistical distribution of the proximities of the catalysts include changing the concentration of catalytic groups on a substrate, changing the temperature at which the catalyst is used, the polarity of the solute, using different solvent systems and changing supramolecular interactions between the catalytic groups.

Another aspect of the invention is another assay for determining whether a statistical proximity effect is influencing the catalytic activity of a test catalyst by:
  (i) providing a test catalyst which may have catalytic activity as the result of the interaction of one or more types of catalytic groups with a reagent or intermediate containing catalytic groups;
  (ii) providing comparative systems which contain the same catalytic groups as the test catalyst covalently tethered to each other in varying proximities and/or dispositions;
  (iii) analysing whether the test catalyst is disproportionately more active or selective than the comparative systems.

Once a statistical proximity effect has be identified as occurring in a catalyst then it should be possible to optimise the activity of the catalyst by changing the conditions to more favourably influence the statistical distribution of proximities between the catalytic groups involved.

DETAILED DESCRIPTION OF THE INVENTION

As mentioned earlier the present invention is predicated on the discovery of a new class of catalysts, referred to as Statistical Proximity catalysts. Their catalytic activity is provided adventitiously by having an adequate concentration of catalytic groups on a substrate so as to thereby locate at least some of the catalytic groups in suitable proximity and suitable disposition relative to other catalytic groups so as to facilitate the reaction of one or more reagents under catalytic conditions.

These catalysts can be formed by locating large numbers of catalytic groups in a discrete volume under suitable physical or supramolecular conditions so to thereby locate significant numbers of catalytic groups in a correct distance and in a correct disposition relative to other catalytic groups to facilitate the reaction of one or more reagents.

These catalysts may also contain multiple, different types of catalytic groups for facilitating the reaction of one or more reagents. They can be prepared by locating sufficient numbers of compounds containing more than one type of catalytic group in a discrete volume under suitable physical or supramolecular conditions so that significant numbers of catalytic groups, located in different compounds, are positioned at a suitable distance and in a suitable disposition relative to other groups to facilitate the reaction of one or more reagents.

These catalysts rely on having favourable positioning of two or more catalytic groups in order to provide a catalytic effect. Many enzymes operate in this manner by favourably positioning two or more catalytic groups within the same molecular framework. However, unlike enzymes, the interacting catalytic groups are not located within the same molecular framework but rather rely on chance to have favourably positioned the catalytic groups. An enzyme tethered to a substrate could still act as a catalyst when the tether is broken and the enzyme dispersed in solution. A statistical proximity catalyst should have substantially less catalytic activity if the catalytic groups are in a more dispersed state in solution.

These catalysts rely on associating large quantities of catalytic groups to a substrate in the hope that some of the groups will be favourably positioned during construction or during operation to provide catalytic activity. They do not require the costly identification or preparation of a complex structure in order to correctly position catalytic groups so to provide catalytic activity.

Statistical Proximity catalysts are thought to have activity due to a statistically based proximity effect (hereinafter referred to as the Statistical Proximity Effect). The term statistical proximity effect is a catalytic effect caused by having a statistically relevant proportion of catalytic groups being adventitiously proximate to each other and in the correct disposition to facilitate reaction by one or more reagents.

Statistical proximity effects are characterised in one aspect by disproportionately large increases in activity or selectivity by a catalyst when the local concentration of the catalytic groups is increased in at least one region of concentration. This increase is non-linear, being larger than would have been predicted from a linear extrapolation of the activity or specificity of the catalyst at a greater dispersion. By way of example if the number of catalytic groups in a discrete region is doubled, the catalytic effect may be increased by a factor greater than two. It is speculated that the reason for this effect is that as the concentration of catalytic groups is increased, an increase in the amount of groups in a discrete volume, there is an increasing chance of locating two groups in a catalytically active arrangement. The effect may be partially or fully neutralised at other regions of concentration by deactivation reactions or by kinetic and other limiting factors.

In another aspect, statistical proximity effects are characterised by increases in catalytic activity at constant concentration upon the application of conditions which cause a change in the statistical distribution of proximities between the catalytic groups. Such changes include, but are not limited to new physical conditions, such as temperatures, acidities, polarities, solvents, or solutes, or the establishment or removal of supramolecular interactions between the catalytic groups or compounds containing the catalytic groups, such as ion-pairing-, hydrophobic-hydrophilic-, hydrogen-bonding-, π-donor-acceptor- or Van der Waals-interactions. By way of example, the introduction of a positively charged substituent on one sample of a neutral catalytic group and the introduction of a negatively charged substituent on another sample of the same catalytic group should result in the catalytic groups ion-pairing when mixed. In this state they should be more closely proximate on average at most concentrations than they would have been without this change.

The term "catalytic groups" as used herein refers to the atoms of a catalyst, which actively participate in the making and breaking of bonds. It may be a discrete atom, a collection of atoms, perhaps in the form of a molecule, or collection of molecules. These catalytic groups may stabilise or partially stabilise reagents in a manner conducive to their reaction with another reagent, similarly stabilised. The stabilising interaction is molecular in nature, consisting of chemical bond formation or a non-adsorptive, stabilising, electronic, or supramolecular interaction. Examples of catalytic groups which may constitute a part of a catalytic group include, but are not limited to, organic heterocyclic molecules, amino acids and peptides, metalloporphyrins, discrete and polymeric coordination complexes, and discrete and polymeric main group and transition metal species. The term "catalytic groups" specifically includes constituent atoms of a conducting polymer or other supporting material which may form the porous matrix of the catalyst and which are capable of stabilising or partially stabilising reagents in a manner conducive to their reaction with another reagent, similarly stabilised.

Other industrial catalysts are multi-site catalysts in which catalysis occurs at multiple sites upon the surface of a large agglomeration of atoms, each of which sites has different physical and chemical properties. Examples of multi-site catalysts include solid metal and metal oxide catalysts. Because these catalysts are typically insoluble in, or in a different phase to their reagent streams, they fall within the category of catalysts known as heterogeneous catalysts.

The catalysts of the present invention are preferably single site catalysts in that preferably the catalytic groups must be positioned relative to each other in one particular arrangement in order to catalyse the reaction. However, it is envisaged that multi-site proximity catalysts could also be formed, particularly as the catalytic activity is largely based on the fortuitous positioning of two or more catalytic groups. If the groups exhibit catalytic activity in two or more different arrangements, a catalyst containing both arrangements should be a multi-site catalyst. It is possible that one arrangement of catalytic groups will be active with one reagent, whilst another arrangement of groups, present in the catalyst, will only be active with another reagent.

The discrete volume is preferably a solid or porous material, a conducting polymer or other carrier materials or support, containing sufficient concentrations of catalytic groups within to provide a catalytic effect. The concentration of the catalytic groups in this volume and the physical and supramolecular conditions employed should be such that statistically relevant proportions of them are correctly proximate to each other and in the correct disposition to facilitate reaction by the reagents. That is a sufficient number of correctly positioned catalytic groups to provide a measurable, and more preferably useful, catalytic effect.

Furthermore, it is preferred to use catalytic groups that are highly selectively in their binding of reagents as this may result in catalytic systems that display both proximate binding and lock-and-key binding.

For ease of manufacture the compounds used in the catalyst and containing the catalytic group, may be all the same compounds. However, it is envisaged that it would be possible to also form catalysts that would exhibit a statistical proximity effect by using a combination of different catalytic groups, and thus different compounds.

Statistical Proximity catalysts differ from all other catalysts in that they exhibit disproportionately high catalytic activities or catalytic selectivities when sufficiently high concentrations of the catalytic groups are present on the support, such as within a conducting polymer, or when, at constant concentration, conditions are changed to increase the statistical likelihood that the catalytic groups will be in the optimum proximity and disposition. The compounds containing or forming the catalytic groups are not noticeably catalytically active or selective, or are disproportionately less catalytically active or selective when present in a more dispersed (less concentrated) form, such as in open solution, or under less suitable conditions.

Statistical proximity catalysts can be distinguished from metal, metal oxide, aluminosilicate, and other porous and non-porous solid, heterogeneous catalysts by the presence and need for molecular or atomic catalytic groups either within or on a support or a supporting substrate. Furthermore metal and metal oxide, aluminosilicate, and other porous and non-porous solid, heterogeneous catalysts are inevitably multi site heterogeneous catalysts unlike the hybrid heterogeneous-homogeneous statistical proximity catalysts. The prime catalytic interactions of metal and metal oxide, aluminosilicate, and other porous and non-porous solid, heterogeneous catalysts involve bulk adsorptive properties. In contrast the catalytic activity of a statistical proximity catalyst is molecular in nature. Importantly, when statistical proximity catalysts are dispersed into solution or placed under less advantageous statistical conditions, they can decrease in activity or selectivity due to the decreased likelihood of appropriately locating two catalytic groups. The statistical proximity catalysts also have the distinctive Statistical Proximity effect.

Statistical Proximity catalysts can be distinguished from mononuclear molecular catalysts which operate in isolation from each other by the presence and need for more than one catalytic group at the molecular level to effect the catalytic process.

Statistical Proximity Catalysts differ from molecular catalysts containing catalytic groups chemically tethered to each other, such as enzymes or artificial enzymes, in that the catalytic groups in a statistical proximity catalyst are preferably not connected to each other by chemical bonds, or alternatively connected in such a way that the chemical bonds play an insignificant role in making them correctly proximate during catalysis. Their proximity to each other during catalysis is the result of statistical factors rather than the presence of interconnecting chemical bonds. Statistical Proximity Catalysts are therefore non-biological in origin.

Statistical Proximity catalysts should have advantages of both homogeneous and heterogenous catalysts:
  (AA) they can exhibit high activity and/or selectivity. The selectively can be achieved by requiring the catalytic group to be inactive in an incorrect relationship to another catalytic group.
  (BB) they can generally be used in continuous chemical manufacturing processes because:
    1. their scale allows them to be readily separated from the products they generate, and
    2. their catalytic groups can, in many cases, be continuously regenerated by in-situ electron transfer. This may be done via an electrode support, such as through the use of a conducting polymer framework, or via a sacrificial reagent intermediate.
  (CC) depending on the specificity of the catalytic groups employed, they may be highly resistant to poisoning.

It should be understood that this application pertains to any catalyst, which can reasonably be understood to operate because of the Statistical Proximity effect. This is regardless of the specific reagents used, products produced, catalyst components present, conditions employed, or the overall reactions involved in the operation of such catalysts.

In another aspect of the invention, there is provided a method for preparing Statistical Proximity catalysts.

The formation of a Statistical Proximity catalyst is preferably achieved by locating significant numbers of catalytic groups on a support or supporting substrate. One means of doing this is the electrochemical growth of an electroactive polymer, on a conducting substrate, from a solution of its monomer and an anion or a monomer containing the catalytic groups. The growth of the electroactive polymer may be brought about by the application of a constant potential (potentiostatic growth), a varying potential (potentiodynamic growth), or a constant current (galvanostatic growth) upon the conducting substrate.

The terms "conducting polymer" or "electroactive polymer" as used herein refers to any polymeric substance which can display inherent electrical conductance of greater than $0.001$ S cm$^{-1}$ under suitably favourable conditions. Examples of conducting polymers include, but are not limited to, polypyrrole, polyaniline and polythiophene.

Other means of catalyst preparation include, but are not limited to
  (i) the formation by purely chemical means of a conducting polymer in the presence of an anion, a cation or a monomer containing the catalytic groups.
  (ii) ion-exchange processes in which an ionic dopant within an existing porous matrix, such as within polymers like NAFION®, a perfluorocarbon sulfonic acid based ionomer, or Sephadex® or Amberlite® or Dowex®, is exchanged for new ions containing catalytic groups.
  (iii) the formation by polymerization, sol-gel or other techniques of porous, solid and polymeric materials, such as zeolites or porous silica or glass, containing catalytic groups, or the diffusion of catalytic groups into such species under suitable conditions.
  (iv) coating a suitable support or supporting substrate with a solution of a compound having a catalytic group, where the compound is not soluble in a particular solvent system, for subsequent use of the coated support in the particular solvent system.

The term "electrode" or "conducting substrate" as used herein refers to any metal, metal alloy, or non-metallic or composite substances, which is capable of transporting electrical charge to and/or from a solution in which it is placed. Examples of metals include, but are not limited to, iron, platinum and palladium. Examples of metal alloys include, but are not limited to stainless steel, steel and brass. Examples of non-metals include, but are not limited to carbon, electroactive polymers, conducting glass and silicon.

Without limiting the generality of the description to this point, another aspect of the invention provides for a specific Statistical Proximity catalyst particularly useful in the generation of hydrogen gas from aqueous acidic solutions.

It has been surprisingly found that incorporation of particular ferrocenes in electrodes useful in the generation of hydrogen from aqueous acidic solution can substantially lower the voltage required for, and improve the efficiency in such hydrogen generation. By ferrocene or ferrocenes it is intended to include unsubstituted and substituted forms of ferrocene.

Accordingly, in another aspect of the present invention there is provided an electrode suitable for use in the generation of hydrogen gas from an acidic aqueous solution, said electrode comprising a ferrocene.

While [1.1]ferrocenophanes are excellent hydrogen generation catalysts, individual ferrocene molecules are not noticeably catalytically active when dispersed in open solution. However, incorporation of ferrocene by ion-pairing in conducting polypyrrole, electrochemically grown on a platinum substrate, produces a layer of conducting polymer which is capable of catalytically generating hydrogen extraordinarily efficiently. Substantial amplifications in the rate of hydrogen production compared to uncoated platinum under otherwise identical conditions are observed. Studies show that these results are associated with statistical proximity effects arising from high local concentrations of the ferrocene catalytic group which are created within the conducting polymer during its formation. While [1.1]ferrocenophanes require complicated, multi-step synthetic procedures for their preparation, conducting polymers doped with ferrocene-bearing species are readily and easily prepared.

Accordingly, in another aspect of the present invention there is provided a catalyst suitable for use in the generation of hydrogen gas from an acidic aqueous solution, said catalyst comprising a ferrocene incorporated within a conducting polymer or other support.

The ferrocene may be incorporated into the electrode in a number of ways. In one embodiment the ferrocene is coated onto the surface of an electrode substrate as part of a polymeric coating.

The polymeric coating is preferably a conducting electroactive polymer containing anionic ferrocenes as counter ions. The coating of the electrode substrate, which is usually metal, allows immobilisation and concentration of the ferrocene at the surface.

In another embodiment of the present invention the ferrocenes are directly coated onto the surface of an electrode substrate without the use of an electroactive polymer. According to this embodiment the invention provides a method for the preparation of an electrode suitable for the generation of hydrogen gas from aqueous acidic solution comprising treating an electrode substrate with a ferrocene such that said ferrocene is incorporated into or on said substrate and concentrated at an outer surface region of said substrate.

This may be achieved by a number of methods including evaporation of a solution or suspension of the ferrocene embedding the ferrocene as a solid on the surface of the electrode or by attaching the ferrocene to the surface of the electrode substrate via a linking agent which allows bonding of the ferrocene to the electrode substrate surface. The bonding of the ferrocene to the substrate surface is the least preferred alternative as it can prevent the dynamic movement of the ferrocene group on the substrate surface.

It is thought that permitting the dynamic movement of the ferrocene (or other catalytic group) about the surface of the substrate by using reversible attachment methods may improve the statistical likelihood of two catalytic groups being appropriately positioned for a catalytic interaction with a reagent.

The electrodes according to the present invention advantageously provide improved methodology for the electrochemical generation of hydrogen gas from aqueous acidic solutions, which electrodes have improved resistance to electrode poisoning, thereby allowing sustainably higher hydrogen production over extended periods using lower voltages.

The process according to the present invention allows the selective concentration of electroactive catalytic groups to be immobilised at the electrode surface.

In a preferred embodiment the ferrocene has the Formula I. Formula II below depicts the structure of a [1.1]ferrocenophane. Formula III below depicts the structure of a poly (ferrocene). Formula II and III also represent model compounds for the Statistical Proximity Catalyst of example 1.

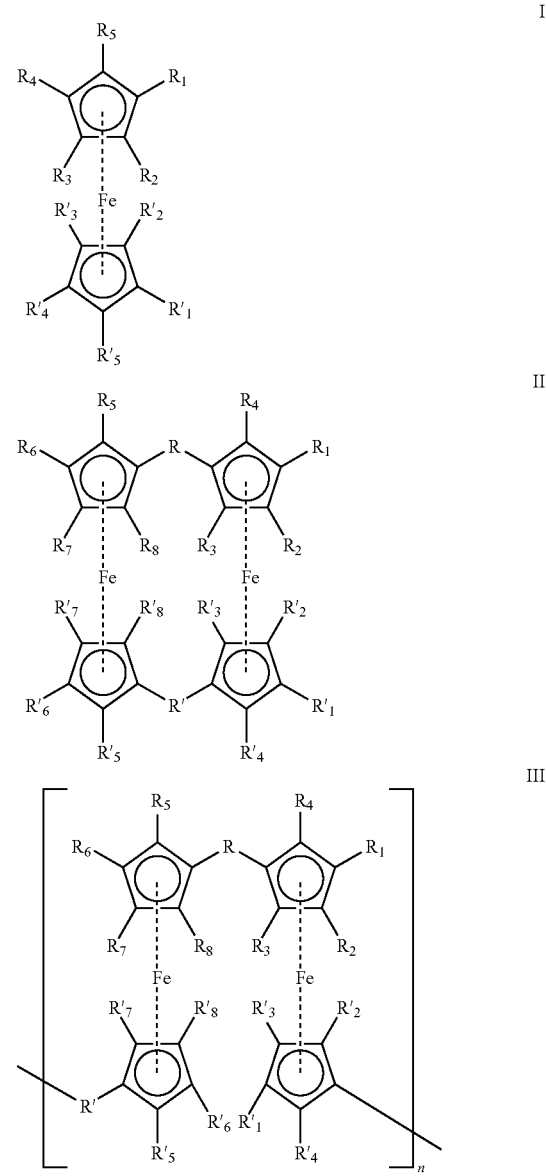

where each $R_1$ to $R_8$ and $R'_1$ to $R'_8$ is independently selected from hydrogen or a substituent, each R and R' is independently selected from divalent linker groups, and n is greater than or equal to 1.

Preferably, the ferrocenes of formula I exhibit, in their reduced state, an overall neutral charge (for example, when mechanically trapped at the surface of an electrode substrate) or an overall negative charge (for example, when incorporated as anions in certain electroactive polymers) or an overall positive charge (for example, when incorporated as cations in an cation-exchange polymer).

Examples of suitable optional substituents include, but are not limited to $C_{3-20}$ alkyl, $C_{3-20}$ acyl, $-SO_3^{2-}$, $-SO_4^{2-}$ and $-PO_4^{3-}$.

Examples of substituents which incorporate polymerisable groups suitable for incorporation into an electroactive polymer include, but are not limited to, -1-pyrrole, -2-aniline and -3-thiophene.

The term "divalent linker group" as used herein refers to any divalent group capable of linking one ferrocene unit to another.

Examples of divalent linker groups include, but are not limited to, $-CH_2-$, $-SiH_2-$, $-GeH_2-$, $-C(H)(C_{3-20}$ alkyl)-, $-C(H)(C_{3-20}$ acyl)-, $-C(H)(SO_3^-)-$, $-C(H)(SO_4^{2-})-$ and $-C(H)(PO_4^{3-})-$.

Examples of linkers which incorporate monomers of conducting electroactive polymers include, but are not limited to, $-C(H)(-1$-pyrrole)-, $-C(H)(2$-aniline)- and $-C(H)(3$-thiophene).

The term "aqueous acidic solution" refers to an aqueous solution of an acid. The acid may be inorganic or organic. Examples of inorganic acids include, but are not limited to, hydrochloric acid, perchloric acid and sulfuric acid. Examples of organic acids include, but are not limited to, acetic acid, benzoic acid and succinic acid. The acid may also take the form of an acidic polymer, such as a proton exchange membrane.

The electrodes according to this aspect of the present invention may be used in devices requiring a continuous or intermittent supply of hydrogen gas or a continuous or intermittent conversion of hydrogen gas to acid including, but not limited to fuel cells, hydrogen-burning turbines or machinery, semiconductor manufacturing devices, high purity metal manufacturing devices, poly(olefin) manufacturing devices, and hydrogen-based sensors or oxidant/reductants.

The electrodes according to this aspect of the present invention may be utilised by dipping them into an aqueous or acidic aqueous solution over a gaseous or hydrogen atmosphere and applying a suitable voltage to the electrode. The application of a suitable voltage results in generation of hydrogen gas which can be collected using means known to the art. The hydrogen gas generated can be used directly or the hydrogen gas can be transferred to another site for storage and/or use as a fuel, such as in the production of electricity in a fuel cell, or as a chemical reactant, such as in the synthesis of ammonia, or in industrial manufacturing, such as in the manufacture of semiconductors, production of high purity metals or poly(olefins), or as a sensor, as an oxidant/reductant, or in any other applications where hydrogen gas is required.

It has been found that coating an electrode substrate with a ferrocene according to the present invention renders the resultant electrode significantly more resistant to chemical poisoning than an uncoated electrode.

Accordingly in a further aspect of the present invention there is provided a process for increasing the resistance of an electrode to poisoning comprising coating said electrode with a material including a ferrocene. The electrode may be coated in any one of the methods described above in relation to the preparation of the catalysts according to the invention.

The coating of metal electrodes by the methods involving the use of electroactive conducting polymers described above is preferably achieved by electrochemical growth of the conducting electroactive polymer from a solution of its monomer and a ferrocene-substituted anion, cation or monomer at constant potential (potentiostatic growth). Other means of coating include, but are not limited to growth at varying potentials (potentiodynamic growth) and growth at constant current (galvanostatic growth) from a solution of its monomer and the ferrocene-substituted anion, cation or monomer.

Another aspect of the invention relates to a method or assay for determining whether statistical proximity effect is occurring in a catalyst, in order to determine whether that catalyst is a statistical proximity catalyst.

The primary means of demonstrating the presence of a statistical proximity effect involves undertaking kinetic studies. These studies must indicate that:
(i) the presence of one or more types of catalytic group is essential to the observed catalysis; and
(ii) at least one of the steps of the mechanism involves a simultaneous interaction of a reagent or an intermediate, with two or more separate catalytic groups; and
(iii) the step(s) in (ii) occur only because the catalyst is operated under conditions of concentration, temperature, polarity, solvent, solute or other variables which favourably influence the statistical distribution of proximities between the catalytic groups involved, including favourable supramolecular interactions between the catalytic groups.

An additional confirmation of (iii) can be made by preparing a range of model compounds that contain the catalytic group or groups covalently tethered to each other in varying proximities and/or dispositions. A Statistical Proximity Effect is confirmed in the original catalyst if it can be shown that one of the model compounds, containing the catalytic groups in one particular proximity or disposition, is disproportionately more active or selective than the others.

A variety of standard techniques may be used to conduct the kinetic studies. These include electrochemical, UV-visible, Nuclear Magnetic Resonance, Electron Spin Resonance, mathematical modelling, isotope-exchange and enrichment techniques, as well as the full range of analytical and other techniques available.

These techniques are illustrated in the example below. In example 1C(i), ferrocene monosulfonate is shown to be the catalytic group in the catalytic conversion of $H^+$ to $H_2$ by $PPy$-$FcSO_3$. Example 1C(ii), sets out a kinetic study of the catalytic conversion of $H^+$ to $H_2$ by $PPy$-$FcSO_3$ using electrochemical and physical measurements. This study demonstrated that one step of the catalysis involved the simultaneous interaction of two ferrocene monosulfonate groups to form the product. The example also demonstrates that the catalysis, including the step referred to above, is disproportionately less active, and, in fact, does not occur at low concentration. This can only be due to the fact that insufficient catalytic groups are correctly proximate at low concentration.

Examples 2 and 3 described two model compounds of the catalytic group. In example 2, a [1.1]ferrocenophane has been tethered to the polymer so that each of the ferrocene catalytic groups is in close proximity to another ferrocene. In example 3, a random distribution of proximities exist between the ferrocene groups. The model catalyst shown in example 2 is demonstrated to be disproportionately more active than that shown in example 3. Thus, proximity plays an important role in the catalysis.

The invention will now be described by reference to the accompanying drawings and examples which illustrate some of the preferred embodiments of the invention. Several of these embodiments pertain to catalysts for use in the oxidation and reduction of hydrogen and acid. However it is to be understood that many other statistical proximity catalysts are thought to exist and these other catalysts may have very different applications to that described below. The invention is intended to encompass all statistical proximity catalysts and the following examples are not to supersede the generality of the preceding description of the invention.

REFERRING TO THE DRAWINGS

FIG. 1. is a schematic depiction of a possible mechanism for the conversion of $H_2$ to $H^+$, and for the conversion of $H^+$ to $H_2$, by using a catalyst of the present invention.

Figure 2:
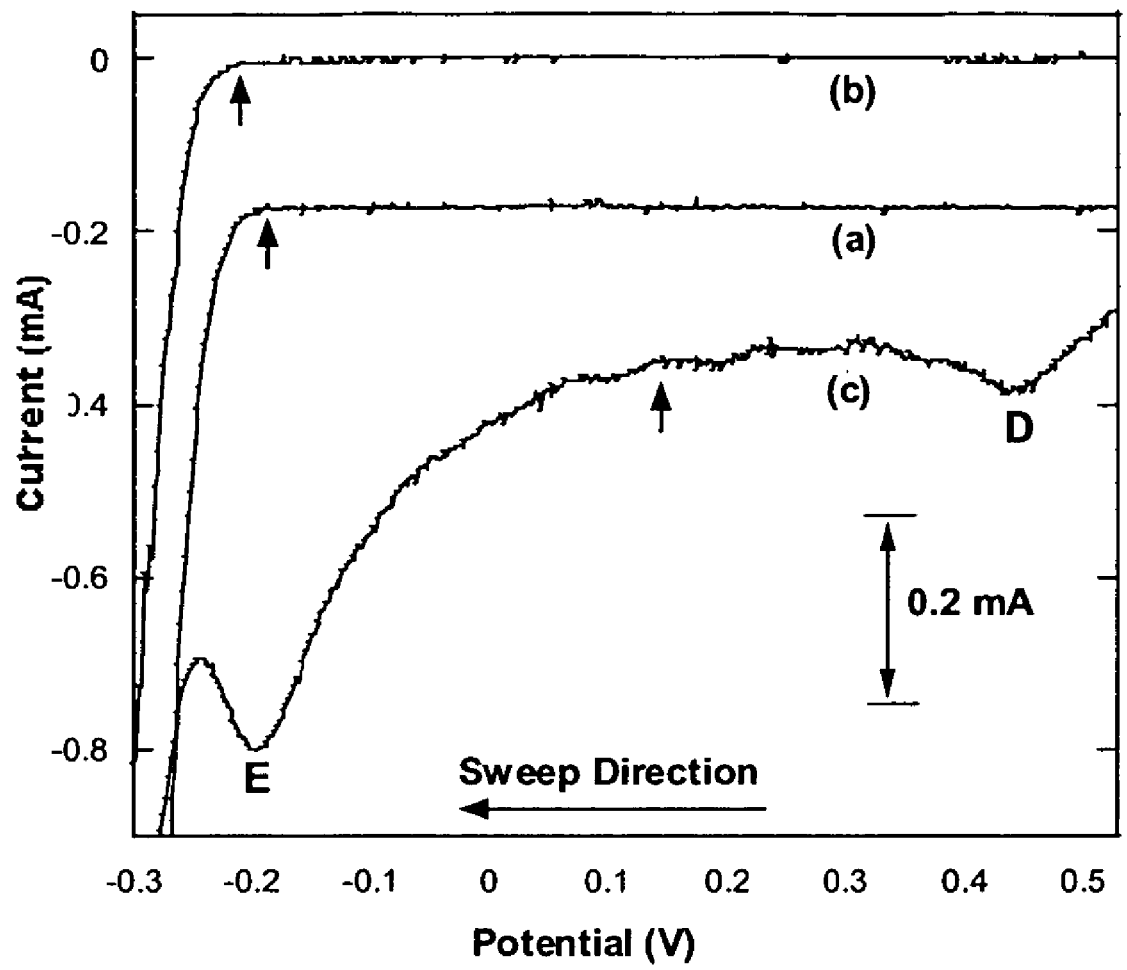

FIG. 2. is a current-voltage plot (first scan, vs. Ag/AgCl) of a platinum electrode of area 0.0177 $cm^2$ in 1 M $H_2SO_4$: (a) before coating (control example), (b) after coating with polypyrrole-p-toluene sulfonate (PPy-pTS) (control example), and (c) after coating with polypyrrole-ferrocene sulfonate (PPy-FcSO$_3$) (scan rate 100 mV $s^{-1}$). The arrows mark the commencement of hydrogen generation in each system as they are swept from positive to negative potential. Point D illustrates the redox peak for ferrocene sulfonate. Point E indicates a temporary interruption in the generation of hydrogen due, most likely, to an adsorption effect, which disappears at potentials negative of −0.24 V. Coatings were deposited to a charge of 100 mC to ensure uniform coating thicknesses.

Figure 3:
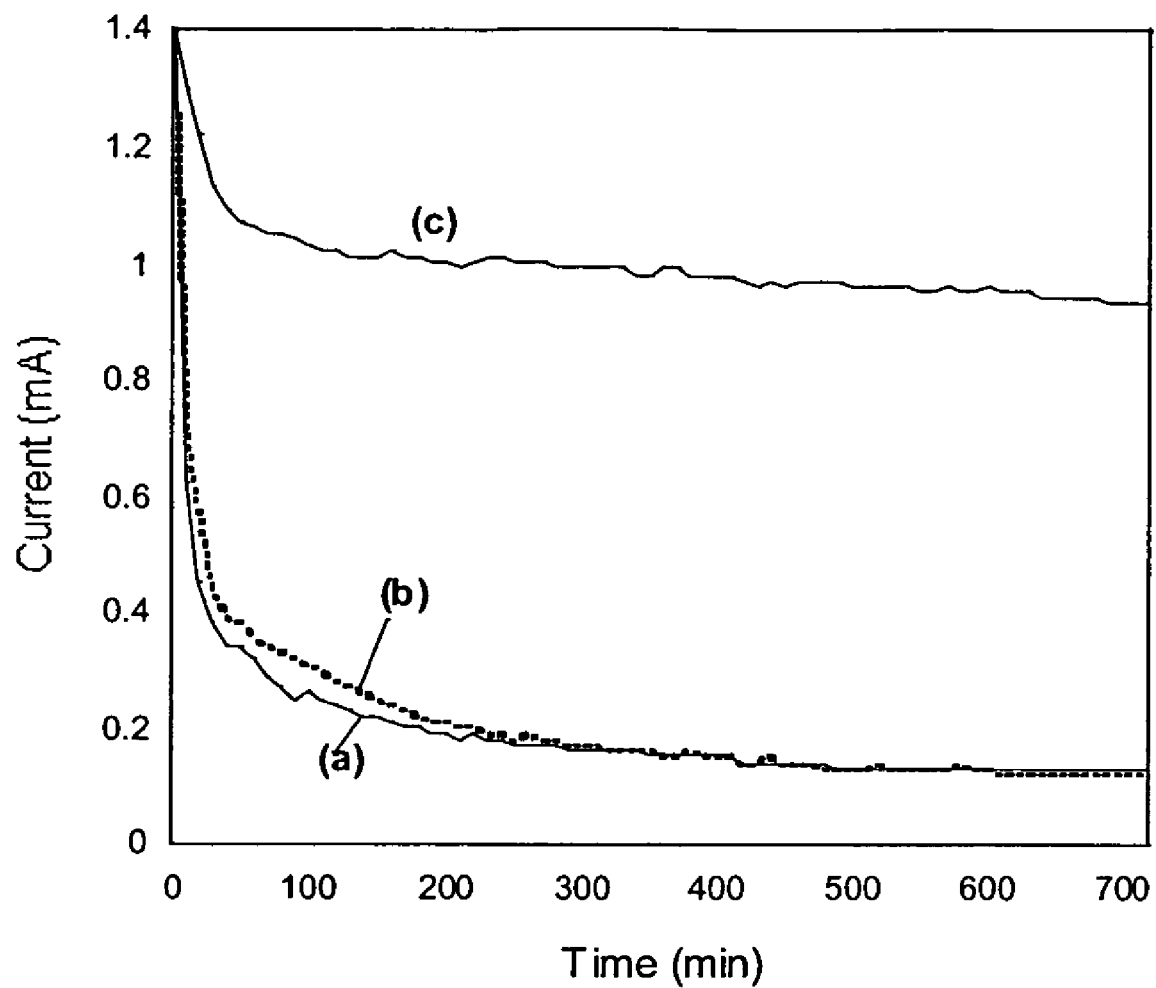

FIG. 3. is a current-time plot (vs. Ag/AgCl) of a platinum electrode having an electrochemical area of 0.0177 $cm^2$ maintained at −0.44 V in 1 M $H_2SO_4$: (a) before coating, (b) after coating with polypyrrole-p-toluene sulfonate (PPy-pTS), and (c) after coating with polypyrrole-ferrocene sulfonate (PPy-FcSO$_3$). Coatings were deposited to a charge of 100 mC to ensure uniform coating thicknesses.

Figure 4:
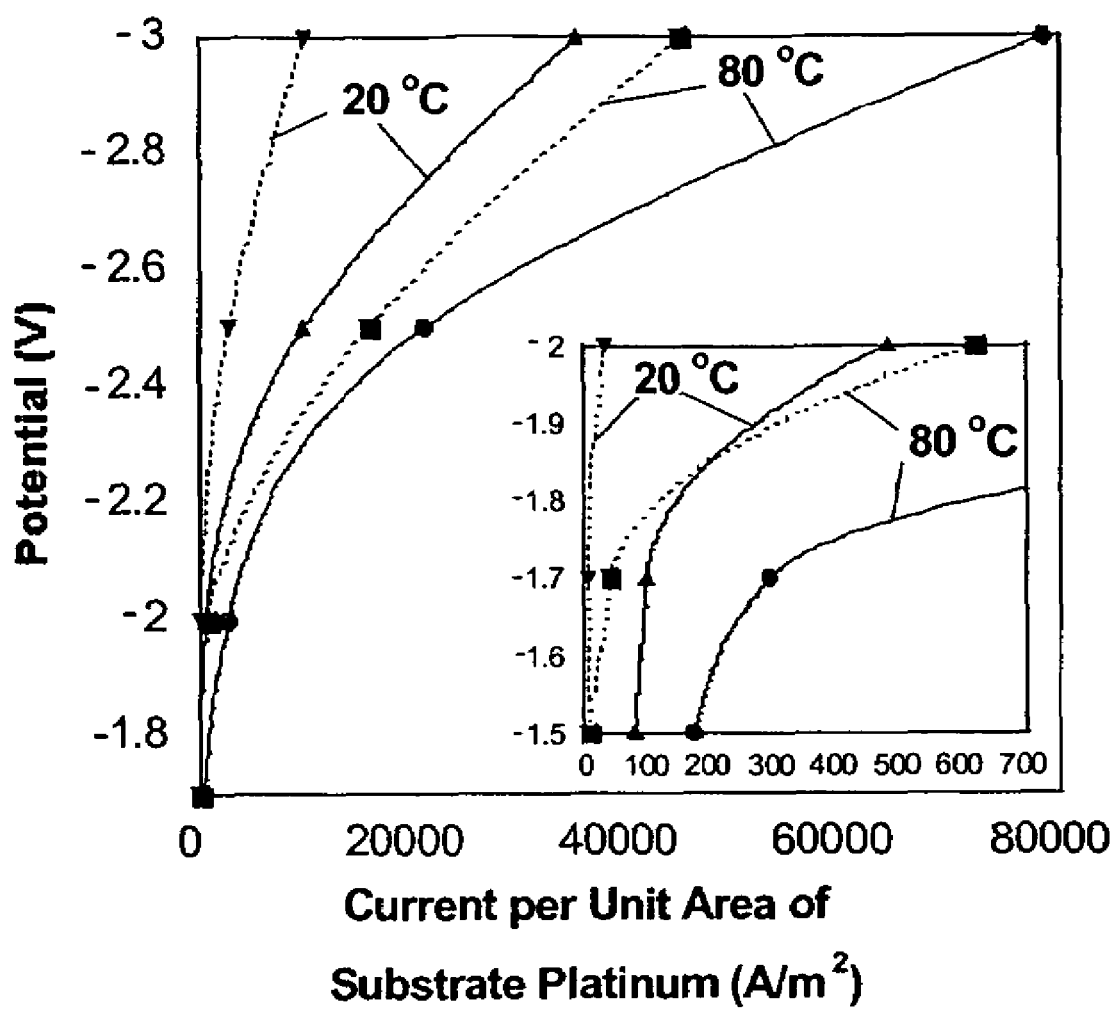

FIG. 4. is a polarization curve for water electrolysis in 1 M $H_2SO_4$ (two-electrode system) after 1 h of operation at 20° C. and 80° C. by a platinum disk cathode before coating (dotted lines) and after coating (solid lines) with PPy-FcSO$_3$. The inset graph details the data at the bottom left of the main graph. A platinum mesh electrode served as the anode. The coating was deposited galvanostatically (1 mA $cm^{-2}$ for 30 min). Electrochemical area of uncoated electrode: 0.0170 $cm^2$; coated electrode: 0.0580 $cm^2$.

Figure 5:
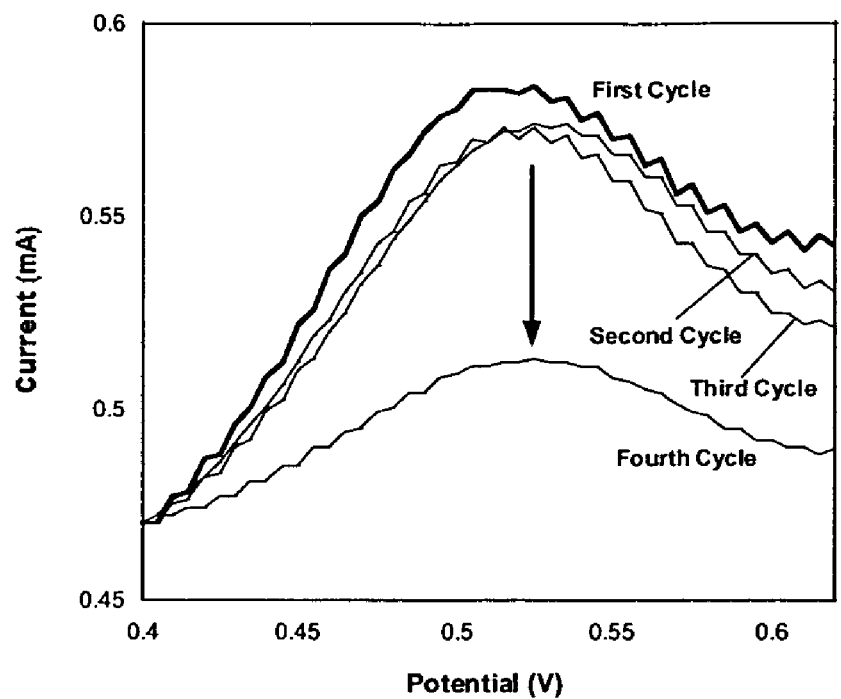
Figure 5:
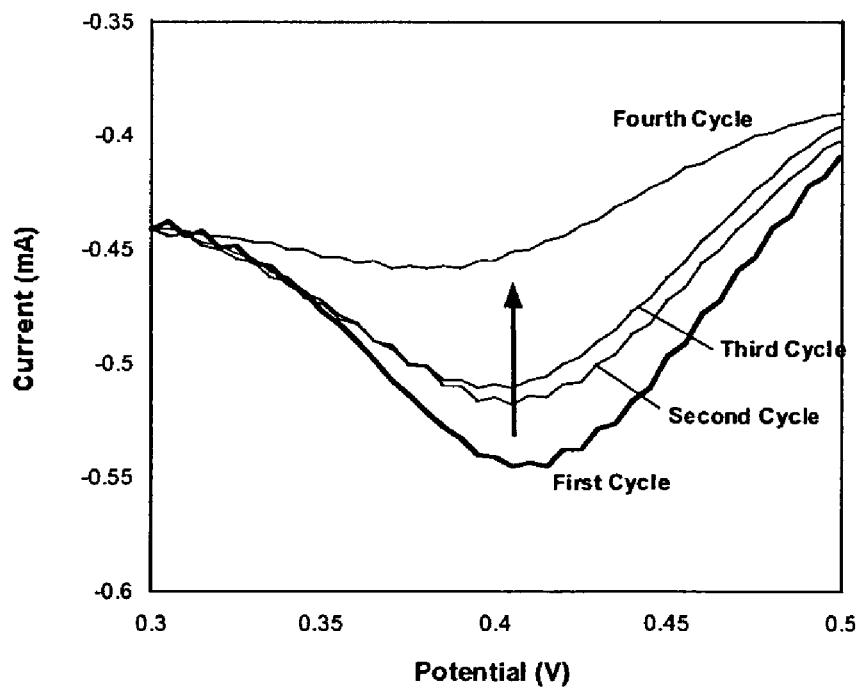

FIG. 5. is the final cyclic voltammogram (vs. Ag/AgCl) on each of four de-doping cycles on the platinum electrode in FIG. 3(c) in 1 M $H_2SO_4$ normalised in the region of the ferrocene oxidation (top graph) and ferrocene reduction peak (bottom graph). Each cycle consisted of 10 cyclic voltammetry sweeps between 0.00 V and +0.80 V at 100 mV $s^{-1}$.

Figure 6:
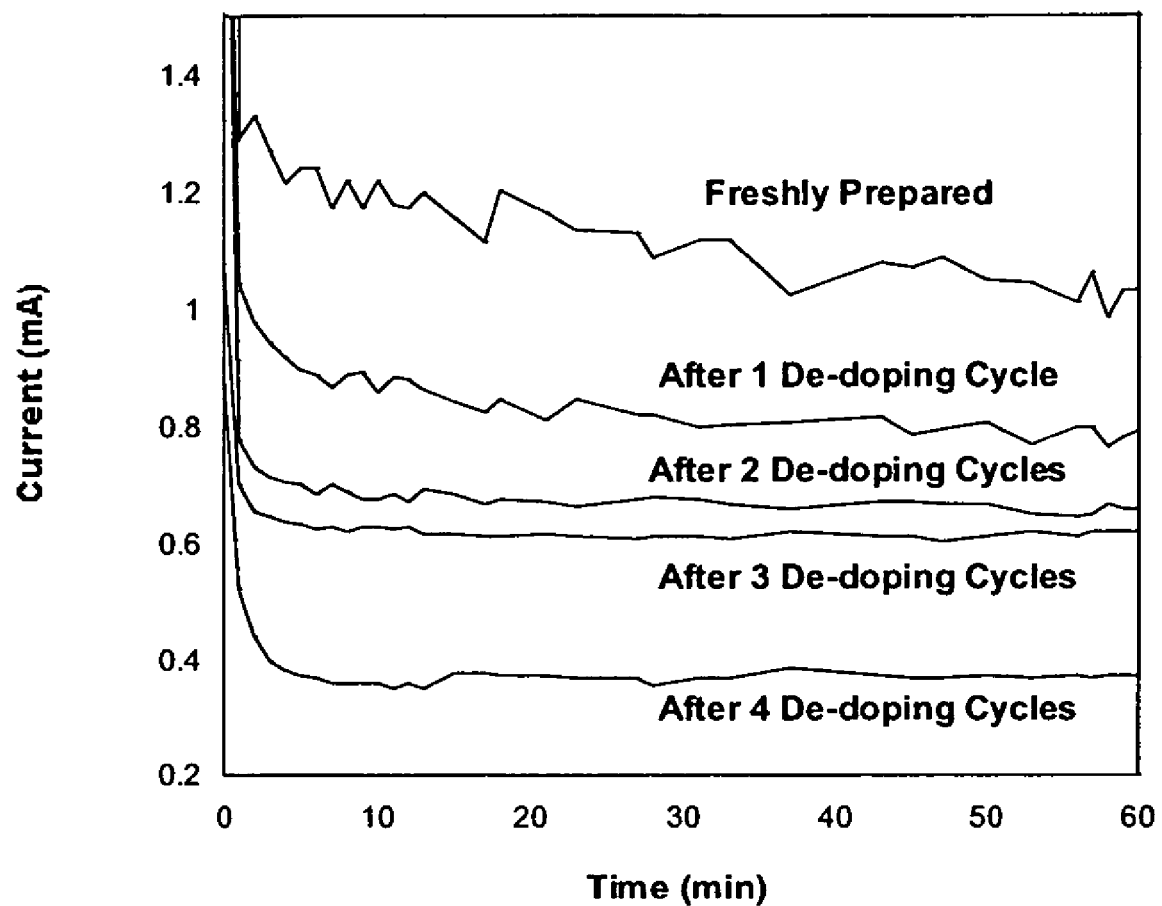

FIG. 6. is a current time plot (vs. Ag/AgCl) at −0.44 V in 1 M $H_2SO_4$ of the platinum electrode in FIG. 3(c) after each of four de-doping cycles in 1 M $H_2SO_4$. Each de-doping cycle consisted of ten cyclic voltammetry scans between 0.00V and +0.80 V at 100 mV $s^{-1}$.

Figure 7:
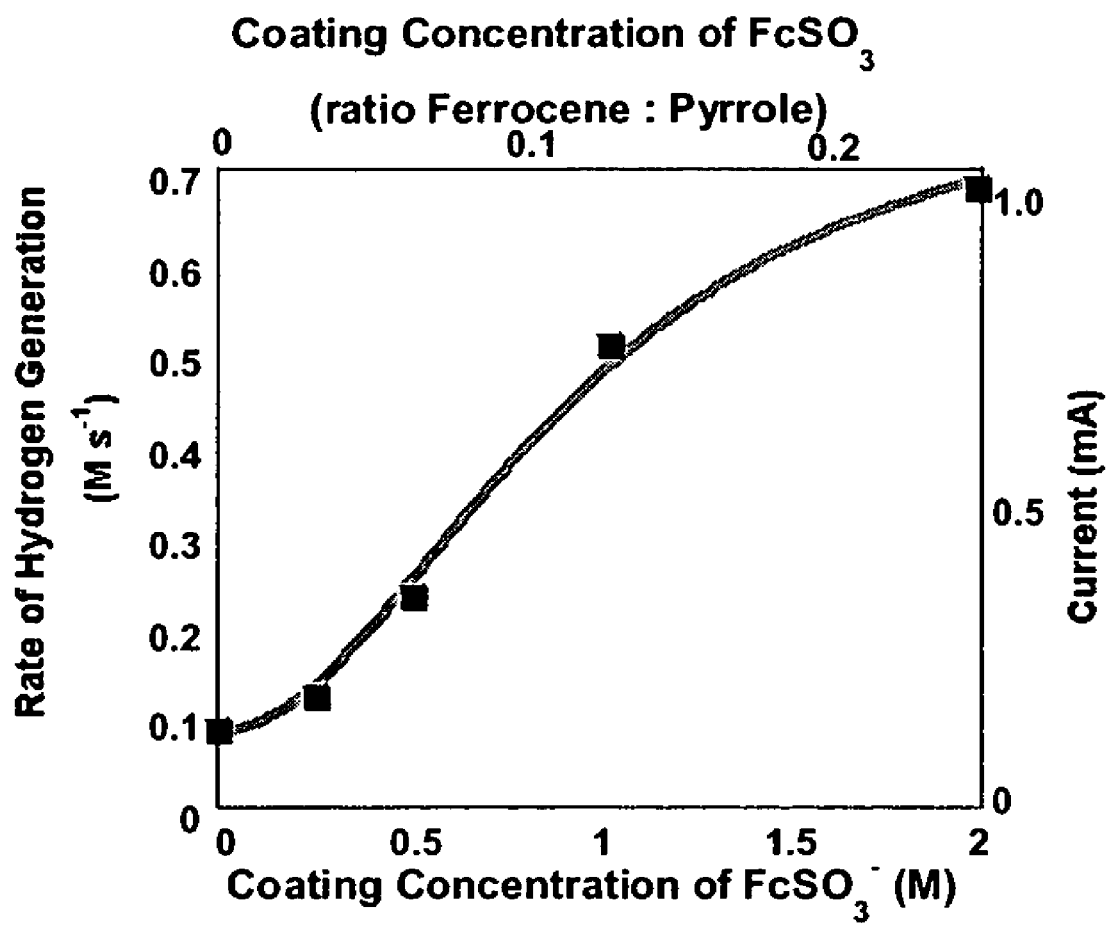

FIG. 7. is a plot of the reaction rate as a function of ferrocene monosulfonate concentration within polypyrrole coatings containing various mixtures of ferrocene monosulfonate and p-toluene sulphonate dopants after 1 h at −0.44 V in 1 M $H_2SO_4$. The points (|) on the graph depict the data from Table 1.

Figure 8:
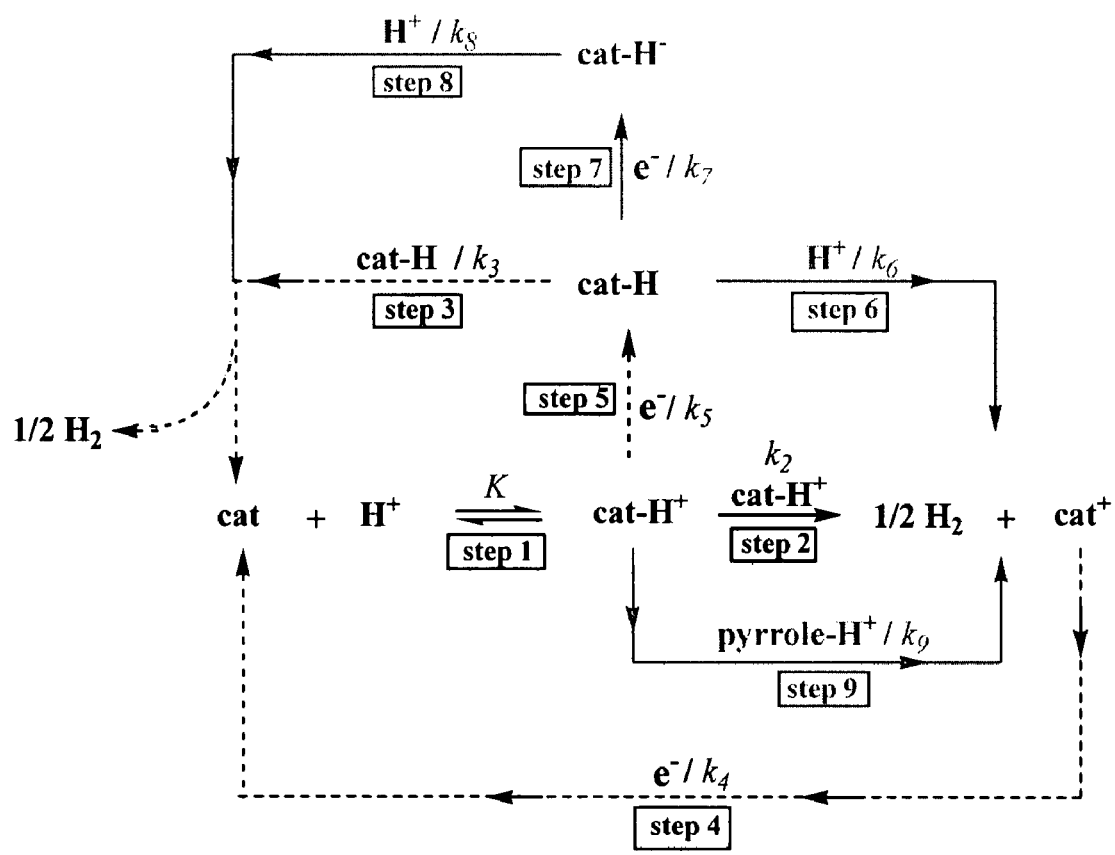

FIG. 8. is a schematic depicting all credible mechanisms for the hydrogen generation catalysis by Pt/PPy-FcSO$_3$ (cat = FcSO$_3^-$, Pt, pyrrole). Pathways involving bimolecular reaction steps are shown in bold.

Figure 9:
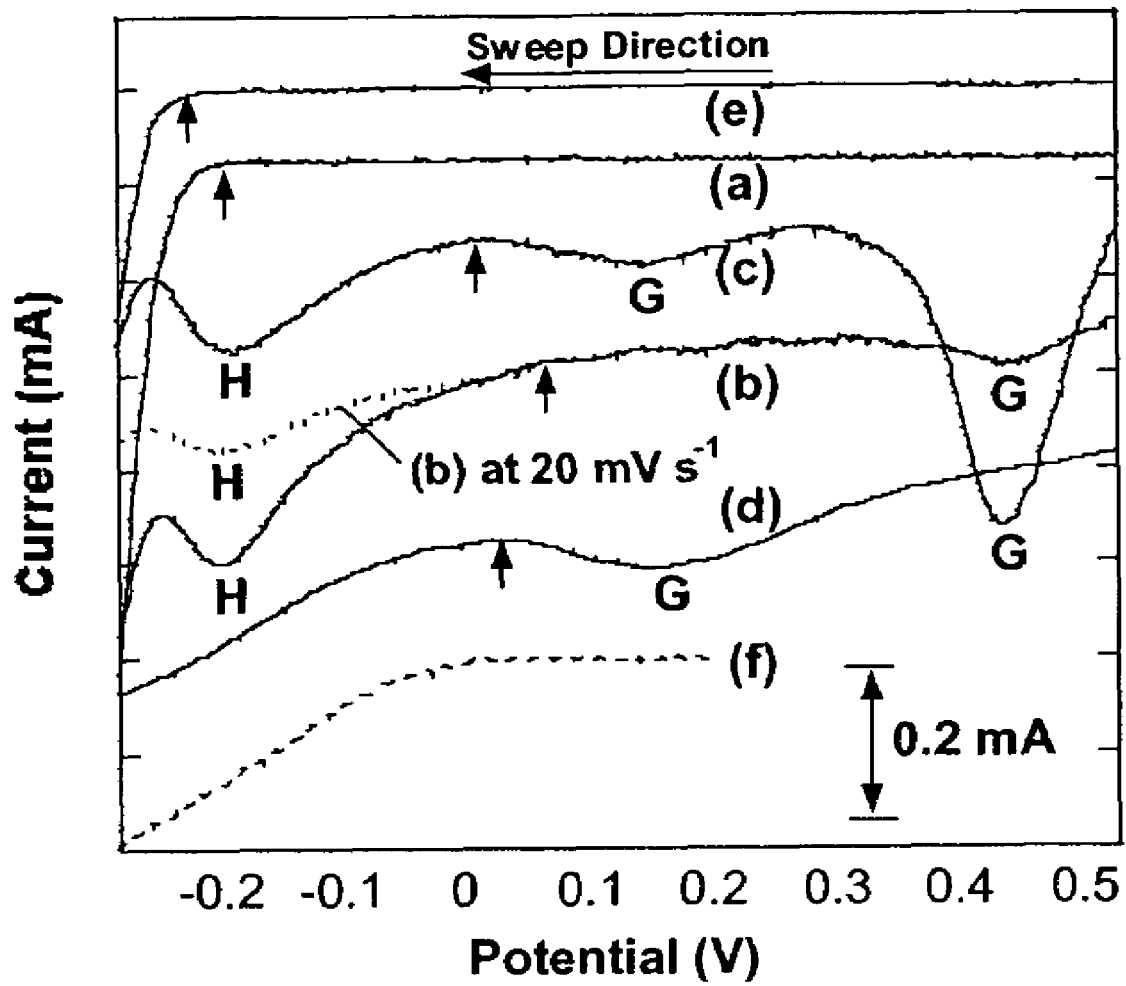

FIG. 9. is a current-voltage plot (first scan, vs. Ag/AgCl) comparing the data in FIG. 2 with results produced under identical circumstances by known proximity based catalysts of similar type. The plots were collected under invariant conditions in 1 M $H_2SO_4$ on a 0.0177 $cm^2$ platinum electrode: (a) before coating (FIG. 2(a)), (b) after coating with PPy-FcSO$_3$ (FIG. 2(c)), (c) after coating with P(Py-co-1), (d) after coating with P(Py-co-2), and (e) after coating with polypyrrole-p-toluene sulphonate (PPy-pTS)(FIG. 2(b)). Scan rate: 100 mV $s^{-1}$. Arrows mark the commencement of hydrogen generation in each system as they are swept from positive to negative potential. Points G are ferrocene reduction peaks. Points H mark temporary interruptions in hydrogen generation due, most likely, to adsorption of hydrogen within the carrier polymer. The dotted line indicates peak H in (b) at a scan rate of 20 mV $s^{-1}$. The dashed line (f) indicates the area-equivalent response of methyl[1.1]ferrocenophane tethered to polystyrene in 1 M $HClO_4$ as displayed in the article: "[1.1]Ferrocenophanes as Effective Catalysts in the Photoelectrochemical Hydrogen Evolution from Acidic Aqueous Media" by U. T. Mueller-Westerhoff and A. Nazzal in the *Journal of the American Chemical Society*, Volume 106 (1984), page 5381-5382. All coatings were deposited to a charge of 100 mC to ensure uniform coating thicknesses.

Figure 10:
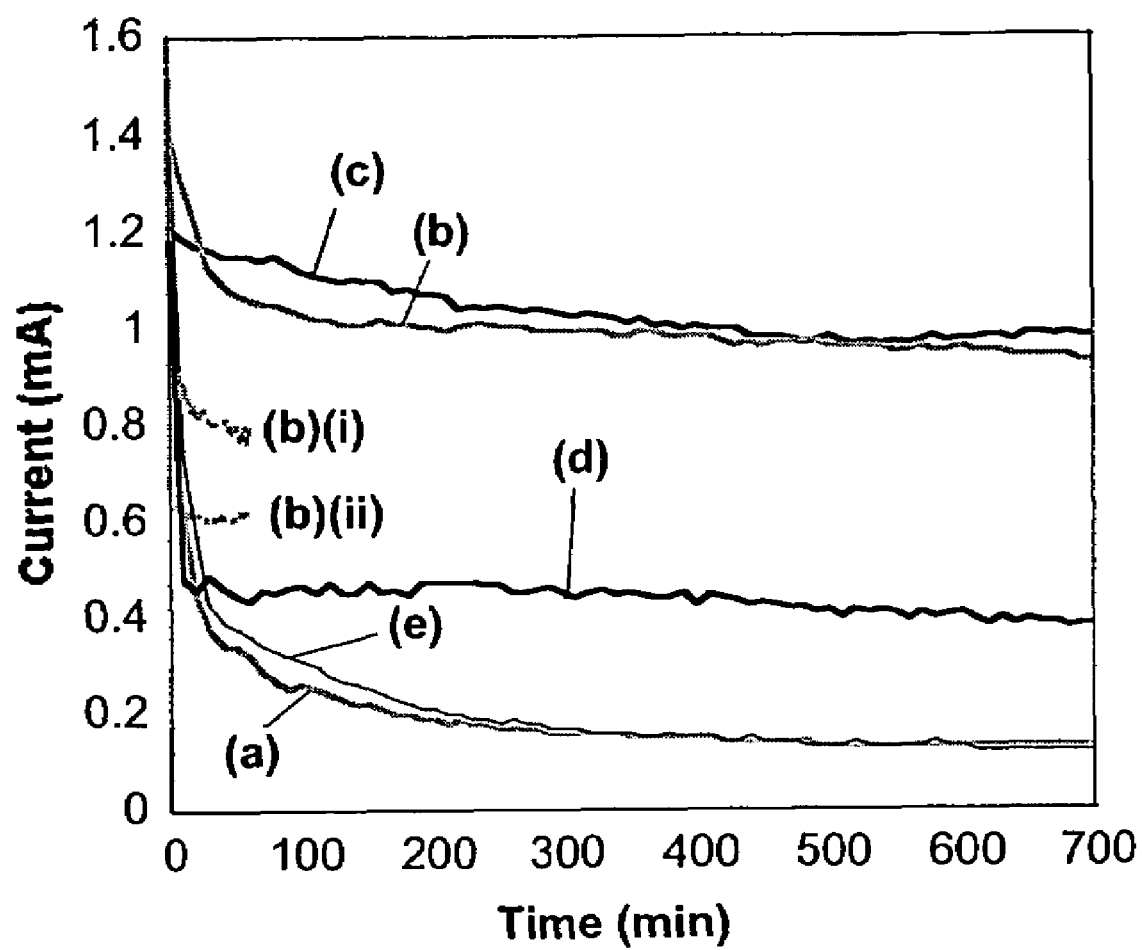

FIG. 10. is a current-time plot (first scan, vs. Ag/AgCl) comparing the data in FIG. 3 and FIG. 5 with results produced under identical circumstances by known proximity based catalysts of similar type. The plots were collected under invariant conditions using a 0.0177 $cm^2$ platinum electrode poised at −0.44 V in 1 M $H_2SO_4$: (a) before coating (FIG. 3(a)), (b) after coating with PPy-FcSO$_3$ (FIG. 3(c)), (c) after coating with P(Py-co-1), (d) after coating with P(Py-co-2), and (e) after coating with polypyrrole-p-toluene sulfonate (PPy-pTS)(FIG. 3(b)). The dashed curves are from FIG. 5 and indicate the performance of coating (b) after one de-doping cycle ((b)(i)) and after two de-doping cycles ((b)(ii)). All coatings were deposited to a charge of 100 mC to ensure uniform coating thicknesses.

The simplest and best-known system with which to demonstrate the principles of statistical proximity catalysis involves the electrochemical conversion of $H^+$ to $H_2$. To assist in the understanding of the catalytic oxidation of hydrogen or the reduction of acids by molecular catalysts, FIG. 1 depicts the action of a catalyst having two catalytic groups. This catalyst may possibly be a natural catalyst, such as certain of the hitherto unelucidated hydrogenase enzymes, a synthetic catalyst, such as [1,1]ferrocenophane, or a statistical proximity catalyst. For ease of description the action is described with reference to a statistical proximity catalyst capable of oxidising hydrogen and reducing acid.

The symbol (A) represents a catalytic group. Two catalytic groups are located in the required proximity to each other and in a suitable arrangement or configuration, to permit a catalytic interaction during a reaction. Each catalytic group may independently be an atom, a group of atoms, a molecule or group of molecules that are capable of stabilising a transition state of a reaction when present in close proximity to at least one other catalytic group.

The left arrows, moving up the page depict the oxidation process. Initially a molecule of hydrogen (H-H) becomes located between two correctly positioned catalytic groups. This may involve a "head-on" interaction as depicted in the drawing, or a "side-on" interaction in which the H-H would be positioned between the catalytic groups in an orientation parallel to a line linking the top and bottom of the page (not depicted in the drawing). A transition state complex then forms wherein each catalytic group stabilizes a hydrogen atom. The covalent bonds between the hydrogen atoms break, and a bond forms between each catalytic group and the hydrogen atom. Finally the catalyst groups release the protons (H⁻).

The right arrows, moving down the page depict the reduction process. Initially protons (H⁺) bind to each of the two catalytic groups located in close proximity to each other and having correct position relative to each other for the subsequent steps. A transition state complex then forms wherein each catalytic group stabilises a proton. A covalent bond then forms between the hydrogen atoms, and the bonds between the catalyst group and hydrogen atoms break. Finally the catalyst groups release the molecule of hydrogen. In the depicted process the catalyst, containing the catalytic groups would need to be recycled, to reset its oxidation state after the reduction or oxidation of acid or hydrogen molecule, in order to close the cycle and allow continuous catalysis.

It should be noted that the processes described above are only possible for molecular catalysts. The best industrial catalyst for the electrochemical conversion of H⁺ to $H_2$ in acidic solution is presently platinum metal, which is a heterogeneous, multi-site catalyst.

Platinum also forms the catalytic surface in the normal hydrogen electrode, against which all other electrochemical potentials are standardised. In order to demonstrate the principles and practical usefulness of statistical proximity catalysts in the conversion of H⁺ to $H_2$, it is therefore necessary to devise a system which allows a ready comparison of the catalytic activity and specificity of the catalyst compared to an equivalent platinum catalyst. This is demonstrated in example 1 below, which offers a proof of the concept of a statistical proximity effect and describes: (A) selected methods for preparing a statistical proximity catalyst, (B) selected catalytic properties of the statistical proximity catalyst thus obtained, (C) selected methods to determine the mechanism of the catalyst and thereby demonstrate the presence and operation of a statistical proximity effect, and (D) implications arising from this proof of concept.

EXAMPLES

Example 1

A. Methods to Prepare Polypyrrole-Ferrocene Monosulfonate (PPy-FcSO₃), a Statistical Proximity Catalyst for the Conversion of H⁺ to $H_2$:

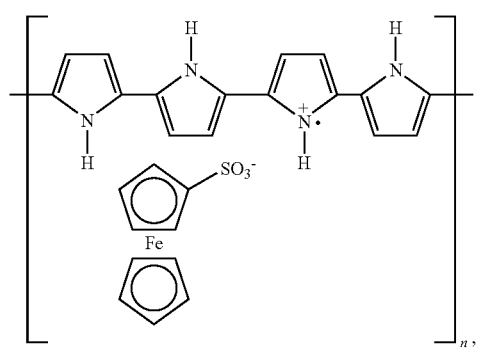

Formula (IV)

n > 2

Polypyrrole-ferrocene monosulfonate (PPy-FcSO₃) (formula IV) could be electrodeposited by potentiodynamic growth performed at 100 mV s⁻¹ between −0.8 V and +0.8 V (vs. Ag/AgCl) on a platinum disk electrode immersed in an aqueous coating solution containing pyrrole (0.5 M) and ammonium ferrocene sulphonate (0.02 M). The cyclic voltamogram of growth displayed the expected increase in current with increasing cycles.

Two sets of redox peaks were identified as the polypyrrole and ferrocene redox potentials. From the growth cyclic voltammogram a potential of +0.56 V was selected as ideal for potentiostatic growth.

PPy-FcSO₃ could be electrodeposited by potentiostatic growth at +0.56 V on a platinum disk electrode immersed in the same coating solution. The chronoamperogram displayed an increasing current over time, after the initial transient, indicating PPy-FcSO₃ growth.

PPy-FcSO₃ could also be electrodeposited on a platinum disk electrode immersed in the coating solution by galvanostatic growth, which was performed at a current density of 1.0 mA cm⁻². After the initial transient, the potential decreased during polymer growth, indicating the deposited polymer to be conductive. After 10 min, a potential of 0.53 V was obtained.

Post-polymerisation cyclic voltammetry (100 mV s⁻¹ in 1.0 M NaNO₃) was performed on each of the above modified electrodes. Two sets of redox couples, associated with the polypyrrole backbone ($E_P$ −0.080/−0.104 V) and the ferrocene sulphonate counter-ion ($E_P$ 0.512/0.424 V), were in evidence in all cases. The latter couple is consistent with that determined by cyclic voltammetry at a platinum electrode for 0.02 M (NH₄)FcSO₃ in a 1.0 M NaNO₃ solution. All of the above coatings therefore contain substantial quantities of ferrocene monosulfonate (i.e. at high local concentrations).

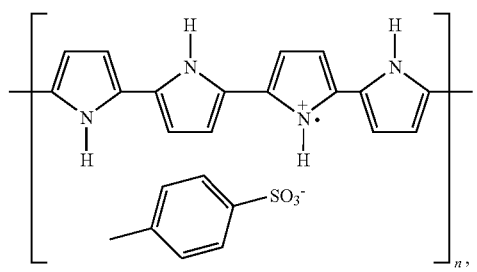

n > 2

As a control, the platinum electrodes employed in these studies were also coated with polypyrrole containing p-toluene sulfonate (PPy-pTS) (formula (V)) or nitrate counter ions (PPy-NO₃) using procedures analogous to those above. Post-polymerisation cyclic voltammetry of these coatings indicated a complete absence of peaks associated with ferrocene.

B. Catalytic Properties of PPy-FcSO₃:

To assess the catalytic properties of platinum when bare or coated with the above coatings, a representative platinum disk electrode of area 0.0177 cm² was employed for comparative studies under strictly invariant conditions. To ensure constancy in coating thicknesses, all coatings were deposited to 100 mC on this electrode.

i. Potentiodynamic properties. The bare platinum and the potentiostatically coated PPy-FcSO₃ platinum electrode were compared by linear sweep voltammetry in 1.0 M H₂SO₄ (1.00 mV s⁻¹) for hydrogen gas generation. The current-voltage plots shown in FIG. 2 indicate the most positive potential for hydrogen at these electrodes to be −0.200 V (bare platinum) and ca. +0.15 V (PPy-FcSO$_3$ modified platinum)(shown by the arrows in FIG. 2(a) & (c)).

Comparative studies with polypyrrole identically doped with toluenesulphonate counter-ions (PPy-pTS) (formula V) indicated a most positive potential for hydrogen gas generation of −0.208 V under analogous conditions (arrow in FIG. 2(b)).

Comparative studies were also conducted using a pH 1 solution of ammonium ferrocene sulfonate (0.02 M) and H$_2$SO$_4$. The hydrogen decomposition potential was measured and was found to be the same as that of the bare platinum electrode (−0.200 V).

Thus, a significant and substantial anodic shift occurred in the most positive potential for hydrogen gas generation at the platinum electrode when it was coated with PPy-FcSO$_3$. This shift was not brought about by the conducting polypyrrole or by the presence of a sulphonate functionality in the counter-ion (in PPy-pTS) or by ferrocene sulphonate in the bulk solution. This shift indicates that the presence of the ferrocene monosulfonate anion in the polypyrrole matrix causes hydrogen to be evolved at much more positive potentials, i.e. at milder conditions, than it would have been otherwise.

ii. Potentiostatic Properties at a selected voltage. Further tests examined the potentiostatic rate of hydrogen generation for the bare and PPy-FcSO$_3$-coated platinum electrode. These were carried out at a potential of −0.440 V (vs. Ag/AgCl (3 M)NaCl)), which is 0.200 V cathodic of −0.24 V, the most positive potential at which the adsorption effect associated with peak E in FIG. 2 was observed. This precaution ensured that accurate data, unaffected by adsorption and other effects, was obtained. The results of these experiments are illustrated in FIG. 3; the current shown was separately determined to be an accurate representation of the quantity of hydrogen produced.

As can be seen in FIG. 3(c), after 12 h the platinum electrode produced hydrogen at a seven-fold greater rate when it was coated with PPy-FcSO$_3$ than when it was bare (FIG. 3 (a)) or when it was coated with PPy-pTS (FIG. 3(b)).

To assess the extent to which the results in FIG. 2(c) and FIG. 2(a) were affected by the increase in the effective electrochemical area during coating, cyclic voltammetry was performed on the potentiostatically grown PPy-FcSO$_3$ modified platinum electrode, the PPy-pTS-coated electrode and the control, bare platinum electrode (in 0.02 M K$_4$Fe(CN)$_6$/1.0 M NaNO$_3$ at 10 mV s$^{-1}$). The data obtained was used to determine their electrochemical areas, which were established using equation (1) to be 0.0580 cm$^2$ (Pt/PPy-FcSO$_3$), 0.0212 cm$^2$ (Pt/PPy-pTS), and 0.0177 cm$^2$ (bare Pt) respectively.

$$I_p = 0.4463 nFAC_o^*(nF/RT)^{1/2} v^{1/2} nD_o^{1/2} \quad (1)$$

[where $I_p$=peak current (amps), n=electrons per molecule oxidised or reduced, F=Faraday's constant (C), A=area (cm$^2$), $C_o^*$=bulk concentration (mol cm$^{-3}$), R=gas constant (J mol$^{-1}$K$^{-1}$), T=temperature (K), v=scan rate (V s$^{-1}$), and $D_o$=diffusion coefficient (cm$^2$ s$^{-1}$)].

The currents per unit electrochemical area after 12 h of operation were therefore 7.33 mA cm$^{-2}$ (uncoated platinum), 26.20 mA cm$^{-2}$ (PPy-FcSO$_3$/Pt), and 6.66 mA cm$^{-2}$ (PPy-pTS/Pt). The PPy-FcSO$_3$-coated electrode consequently displayed a substantially greater rate of hydrogen generation per unit electrochemical area than the uncoated and the PPy-pTS-coated electrode. Thus, the PPy-FcSO$_3$ coating is itself acting as a powerful catalyst of the conversion of H$^+$ to H$_2$. The activity of this coating is substantially greater than that of the underlying platinum. This is clearly due, at least partially, to the higher selectivity in catalysis of the PPy-FcSO$_3$-coating, which causes this electrode to be substantially more resistant to poisoning than the bare platinum electrode. The fall-off in activity with time observed for bare platinum in FIG. 3 is consequently not observed for PPy-FcSO$_3$/Pt.

iii. Potentiostatic Properties over a large voltage range. The generality of the PPy-FcSO$_3$ catalysis was assessed by testing a platinum disk working electrode before and after galvanostatic coating with PPy-FcSO$_3$ in a two-electrode water electrolysis cell containing 1 M H$_2$SO$_4$. As shown in FIG. 4, at both 20° C. and 80° C., the coated electrode was significantly more efficient than the underlying bare platinum over the entire potential range to −3.00 V after 1 h of operation.

C. Methods to Determine the Mechanism of the Catalysis by PPy-FcSO$_3$. Methods to Determine the Presence of a Statistical Proximity Effect The primary means of studying mechanisms of this class of catalyst involves changing the local concentration of the catalytic groups within the porous solid support or upon the substrate surface and determining the effect of such changes on the overall activity of the catalyst. Other means, not described here, may also be used. These include isotope-exchange and enrichment techniques, Nuclear Magnetic Resonance studies, Electron Spin Resonance studies, mathematical modelling, and the full range of analytical and other techniques available.

i. Doping or De-doping Studies. At potentials positive of its ferrocene redox potential, ferrocene monosulfonate is in its oxidised, neutral form and therefore unable to ion-pair the radical cations in the backbone of conducting polypyrrole. PPy-FcSO$_3$ coatings can consequently be de-doped of ferrocene monosulfonate by cycling PPy-FcSO$_3$-coated electrodes to potentials strongly positive of the ferrocene redox potential. Optimal control of the de-doping of the Pt/PPy-FcSO$_3$ electrode described earlier was achieved by performing ten cyclic voltammetry scans on PPy-FcSO$_3$ between 0.00 V and +0.80 V (vs. Ag/AgCl) in 1 M H$_2$SO$_4$ ($E_{FcSO_3}$=+0.47 V). FIG. 5 shows the final cyclic voltammogram (CV) in each of four such de-doping cycles, normalised in the regions of maximum ferrocene response. FIG. 6 details the potentiostatic performance over 60 min at −0.44 V in 1 M H$_2$SO$_4$ of a platinum electrode coated with PPy-FcSO$_3$ after being partially de-doped of FcSO$_3$. It is clear that the catalytic activity of the coating is diminished when the quantity of ferrocene monosulfonate within it, and therefore also its local concentration is decreased. The ferrocene monosulfonate is therefore unequivocally a catalytic group in the reaction.

ii. Studies involving Mixed Dopants. In order to quantitatively study the influence of the ferrocene monosulfonate dopant on the rate of hydrogen production by the PPy-FcSO$_3$-coated platinum electrode, a series of coatings containing mixtures of ferrocene monosulfonate (FcSO$_3^-$) and p-toluene sulphonate (pTS$^-$) were prepared.

PPy-FcSO$_3$/pTS coatings were electrodeposited to a charge of 100.0 mC on the representative 0.0177 cm$^2$ platinum disk electrode by potentiostatic growth at +0.60 V from coating solutions containing pyrrole (0.50 M), ammonium ferrocene monosulfonate (0.00-0.02 M), and sodium p-toluene sulphonate (0.00-0.02 M) in water. Post-polymerisation cyclic voltammetry of the coated electrodes in aqueous 1.0 M NaNO$_3$ indicated two sets of redox couples, associated with the polypyrrole backbone ($E_p$ −0.08/−0.10 V) and the ferrocene monosulfonate counter-ion ($E_p$ 0.51/0.43 V)(vs. Ag/AgCl). The relative concentration of the $FcSO_3^-$ dopant present in each coating was established, as a ratio of ferrocene:pyrrole (Fc:Py or $Fc_xPy_y$), by elemental analysis. Using scanning electron microscopy measurements, the concentration of $FcSO_3^-$ in each coating could be established. An example of this calculation is set out after Table 1.

In order to measure the relative catalytic rate, each modified electrode was maintained, under invariant conditions, at −0.44 V in 1 M $H_2SO_4$ for 1 h in a reaction cell which was similar to, but not identical to that used in the determination of FIG. 3. To avoid inconsistencies in the signal due to bubble formation, the average rate of catalysis during the $59^{th}$ and $60^{th}$ minutes of operation was established and plotted against the concentration of $FcSO_3^-$ within the coating (FIG. 7). The resulting data (Table 1) was found to be second-order in [$FcSO_3^-$] at low $FcSO_3^-$ doping levels. If all of the dopant molecules have access to the solution and the underlying rate of catalysis (i.e. when [$FcSO_3^-$]=0) remains approximately constant at low $FcSO_3^{31}$ doping levels, then the catalytic mechanism involves a bimolecular step. An analysis of all likely mechanisms for the catalysis (FIG. 8) revealed only two reaction steps displaying a possible second order dependence on [$FcSO_3^-$]; i.e. steps 2 and 3 in FIG. 8.

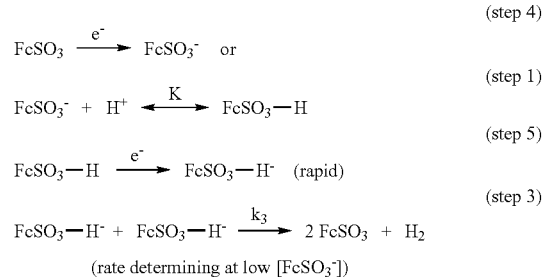

The catalytic activity of the $PPy$-$FcSO_3$ coating is therefore likely to be due to a high local concentration of $FcSO_3^-$ within the coating which creates a statistical proximity effect. Studies indicated [$FcSO_3^-$] in $PPy$-$FcSO_3$ to be 2.02±0.12 M, which is substantially greater than the saturation concentration of 0.41 M for $NH_4^+$ $FcSO_3^-$ in a 1 M $H_2SO_4$ open solution. This would explain why a catalytic effect was not observed when the bare platinum electrode was tested in a 0.2 M solution of ferrocene monosulfonate at pH 1.

Two of the alternative mechanisms (step 6 in FIG. 8 and steps 7-8 in FIG. 8) involve the reduced $FcSO_3$—H interme-

TABLE 1

| Dopant mixture in coating solution[a] | Ratio of ferrocene:pyrrole in coatings (Fc:py)[b] | [$FcSO_3$] (M)[c] | Current (mA)[d] after 1 h at −0.44 V | Reaction rate (M s$^{-1}$)[e] |
|---|---|---|---|---|
| 1  0.02 M $FcSO_3$ | 1:4.17 = 0.230 | 2.02 | 1.010 | 0.680 |
| 2  0.02 M $FcSO_3$ & 0.01 M pTS | 1:8.38 = 0.120 | 1.04 | 0.755 | 0.508 |
| 3  0.01 M $FcSO_3$ & 0.01 M pTS | 1:17.0 = 0.059 | 0.52 | 0.343 | 0.231 |
| 4  0.01 M $FcSO_3$ & 0.02 M pTS | 1:34.0 = 0.029 | 0.26 | 0.180 | 0.121 |
| 5  0.02 M pTS | 0:1.00 = 0.000 | 0.00 | 0.125 | 0.084 |

[a]All coatings were deposited to 100.0 mC on a 0.0177 cm$^2$ platinum disk and tested under invariant conditions
[b]from elemental analyses of the coatings
[c]calculated as described in footnote 1.
[d]average current during $59^{th}$ and $60^{th}$ minutes of operation at −0.44 V in 1 M $H_2SO_4$.
[e]the electrode coatings have a radius of 0.7 mm and a thickness of 5 μm, giving a volume of 7.697 × 10$^{-9}$ dm$^3$.

The concentration of ferrocene monosulfonate dopant in the coatings was determined as described in the following example. A dry, potentiostatically deposited $PPy$-$FcSO_3$ coating of dimensions 18 mm×7 mm was analytically weighed as 0.733±0.010 mg. Scanning Electron Microscopy indicated a coating thickness of 5±2 μm; this was the same as that observed on the test electrodes. Elemental Analysis measurements indicated that $PPy$-$FcSO_3$ contains 9.7% Fe by weight. It therefore contains 1.272×10$^{-6}$ mol $FcSO_3^-$ in 6.30×10$^{-7}$ L volume; i.e. [$FcSO_3^-$]=2.02 M.

This result indicates one of the following mechanisms (see below) operates in the catalysis.

$$FcSO_3^- + H^+ \xrightleftharpoons{K} FcSO_3\text{—}H \quad \text{(step 1)}$$

$$FcSO_3\text{—}H + FcSO_3\text{—}H \xrightarrow{k_2} 2\,FcSO_3 + H_2 \quad \text{(step 2)}$$
(rate determining at low [$FcSO_3^-$])

diate (i.e. cat-fl). If one of these mechanisms are dominant, then it must be possible to produce $FcSO_3$—H, and its accompanying decomposition product, neutral $FcSO_3$ (i.e. cat$^+$), from a saturated, open solution of $NH_4^+$ $FcSO_3^-$ and $H_2SO_4$ at pH 1. However, when a platinum electrode was poised at −0.15 V (i.e. at a potential substantially negative of the ferrocene reduction potential) in such a solution for 24 h, no current whatsoever was observed. Nor could any evidence be found for the presence of neutral $FcSO_3$ as a diffusion product in solution using sensitive analytical techniques. These mechanisms therefore almost certainly do not operate at all.

The only other possible mechanism involves step 9 in FIG. 8:

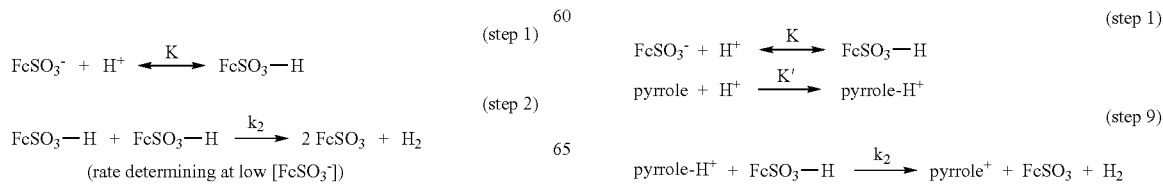

-continued

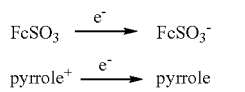
(step 4)

This mechanism is theoretically possible, although pyrrole is not known as a hydride source. The mechanism also does not fit the suggested second order dependence at low [FcSO$_3$]. Finally, if this mechanism does operate, it is not clear why PPy-pTS does not show a greater catalytic efficiency, since two pyrrole-H$^+$ species should presumably also be able to form H$_2$. It therefore is unlikely that this is a dominant mechanism. The role of the polypyrrole in PPy-FcSO$_3$ is more likely to involve a narrowing of the statistical distribution of proximities because of the regularly repeated presence of the ion-pairing pyrrole radical cations in the backbone of the polymer.

If the catalysis nevertheless does occur by this route, it still represents a statistical proximity catalyst, since the protonated pyrrole unit and the protonated ferrocene monosulfonate would need to be in the correct proximity and disposition to facilitate the reaction.

D. Implications of this Proof-Of-Concept

The ferrocene monosulfonate dopant in PPy-FcSO$_3$ is transformed from an inactive catalyst at low concentration (0.2 M) in open solution to an exceedingly active catalyst at high concentration (2.02 M) within the polymer. A much higher selectivity in catalysis is also observed than is the case with bare platinum. This can be ascribed to the selectivity of ferrocene monosulfonate (and, possibly, polypyrrole) in protonation. The need for closely proximate catalytic species indicates that this type of catalysis is comparable, in both principle and practice, to that in enzymes in which individually inactive functional groups are induced to become powerful catalysts purely through the influence of proximity.

These results are significant since they indicate that discrete bi- or polynuclear molecules need not be engineered to achieve enzyme-like proximity effects and catalysis. Instead, concentration of suitable monomeric catalytic groups within a porous carrier can produce a statistical distribution of proximities, some of which are ideal or close to ideal. Just as temperature and pressure can be employed to statistically increase the likelihood that intermediates will be proximate on the surfaces of heterogeneous catalysts, so concentration can be used to create the proximity effects necessary to afford highly efficient molecular catalysis. Statistical Proximity catalysts of this type prospectively offer a diverse, economical, and more convenient alternative to traditional biomimetic catalysts.

Example 2

Comparative Studies Using Known Proximity (Non-Statistical)-Based Catalysts

Another test of whether a catalyst is activated by a statistical proximity effect is to compare its catalytic properties with those of closely related materials which are known to catalyse a reaction because of the influence of proximity. The proximity in the latter arises from deliberate molecular engineering and not statistical influences; i.e. the catalytic groups have been chemically tethered to each other.

For example, as mentioned earlier, the species [1.1]ferrocenophane is known to be an active catalyst in the conversion of H$^+$ to H$_2$. It catalyses the reaction because the two ferrocene catalytic groups within [1.1]ferrocenophane have been synthesised so as to be the correct distance apart and in the correct disposition to stabilise the transition state of the reaction.

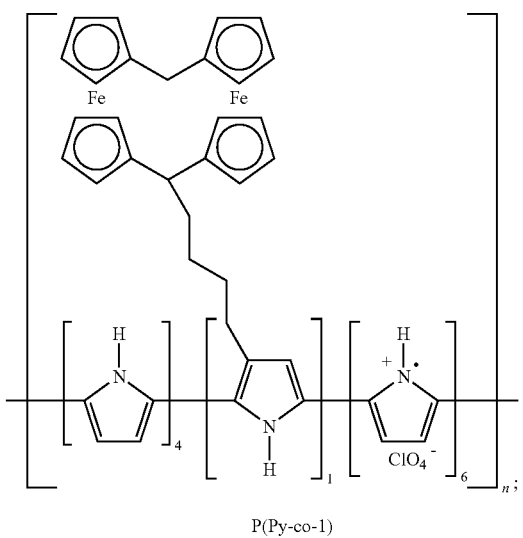

P(Py-co-1)

n > 1

The co-polymer poly(pyrrole-co-(3-(1-[1.1]ferrocenophane-4-butyl)pyrrole)) (PPy-co-1) (formula (VI)), which contains tethered [1.1]ferrocenophane groups (formula II as set out earlier), could be electrodeposited on a platinum disk electrode of 0.0177 cm$^2$ area by potentiodynamic, potentiostatic, or galvanostatic growth from a dichloromethane solution containing pyrrole (0.01 M), monomer 1 (formula (VII))(0.01 M), and tetrabutylammonium perchlorate (0.1 M). Potentiostatic growth was optimally performed at 0.90 V. The total charge consumed during growth was 100.0 mC. Galvanostatic growth was achieved only at current densities of >1.5 mA cm$^{-2}$. A chronopotentiogram for the galvanostically-deposited material (laid down at 2.0 mA cm$^{-2}$) showed the potential to decrease to +0.79 V after 5 min.

Formula (VII)

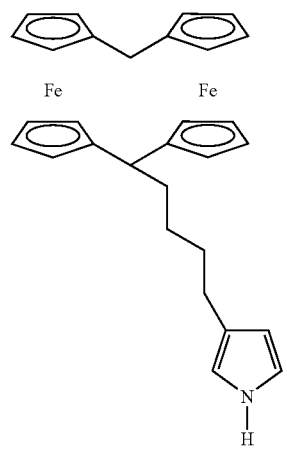

1

Post-polymerisation cyclic voltammetry of the PPy-co-1-coated electrodes in aqueous 1.0 M NaNO$_3$ indicated two redox couples associated with the [1.1]ferrocenophane ($E_p$ 0.52/0.41 and $E_p$ 0.35/0.23) and one due to the polypyrrole backbone ($E_p$ −0.08/—0.17 V)(vs. Ag/AgCl). Free [1.1]ferrocenophane displays two similar redox couples in its CV.

The potentiostatically grown PPy-co-1 modified platinum electrode was then tested by voltammetry in 1.0 M H$_2$SO$_4$ (1.00 mV s$^{-1}$) for hydrogen gas generation. The current-voltage plot shown in FIG. 9(c) indicate the most positive potential for hydrogen generation at this electrode to be ca. +0.00 V. The rising current cathodic of 0.02 V for PPy-co-1 commences at the same potential and has the same profile as that arising from electrocatalytic hydrogen generation by polystyrene-bound [1.1]ferrocenophane in 1 M acid as described in a previous study (FIG. 9(f)). Thus, a significant and substantial anodic shift occurs in the most positive potential for hydrogen gas generation at the PPy-co-1 modified platinum electrode compared to bare platinum; this is to be expected considering the proximate nature of the ferrocene groups in [1.1]ferrocenophane. This shift is similar to that achieved by PPy-FcSO$_3$(FIG. 9(b)).

Further tests examined the potentiostatic rate of hydrogen generation for the PPy-co-1 modified platinum electrode. These were carried out at a potential of −4.440 V (vs. Ag/AgCl (3 M)NaCl)), which is the same as that used in FIG. 3. As shown in FIG. 10(c), a similar rate of catalysis was achieved by PPy-co-1 as by PPy-FcSO$_3$ (FIG. 10(b)) under identical circumstances.

The effect of electrochemical area on the rate of hydrogen production was also examined. Cyclic voltammetry (10 mV s$^{-1}$ in 0.1 M K$_4$Fe(CN)$_6$/1.0 M NaNO$_3$) was performed on the PPy-co-1-coated platinum disk electrode and the electrochemical area was established using equation (1) to be 0.0364 cm$^2$. Thus, the current density after 12 h of operation was 26.93 mA cm$^{-2}$, which compares with 26.20 mA cm$^{-2}$ for PPy-FcSO$_3$/Pt, 6.66 mA cm$^{-2}$ for PPy-pTS/Pt, and 7.33 mA cm$^{-2}$ for uncoated platinum. The rate of catalysis per unit area of PPy-co-1 is therefore also almost identical to that of PPy-FcSO$_3$ under identical circumstances.

These results indicate that proximity plays a central role in the catalytic properties of PPy-FcSO$_3$. The PPy-co-1 coating contains a lower concentration of a less basic ferrocene (on average 1 ferrocene moiety per 5 pyrrole units vs. 1 ferrocene moiety per 4 pyrroles in PPy-FcSO$_3$). The only way these two systems could display similar activities is if a compensating factor, such as proximity, is important. Thus, all of the ferrocene groups in PPy-co-1 are correctly proximate to each other, while only some are in PPy-FcSO$_3$. The binuclear mechanism observed for 1 clearly also operates for the ferrocene species in PPy-FcSO$_3$.

Example 3

Comparative Studies Using Closely Related Catalysts which are Likely to be Proximity-Based.

A further test of whether a catalyst is activated by a statistical proximity effect is to compare its catalytic properties with those of closely related materials which are likely to catalyse a reaction because of the influence of proximity. The proximity effects in these materials arise from deliberate molecular engineering and not statistical influences; i.e. the catalytic groups have been chemically tethered to each other.

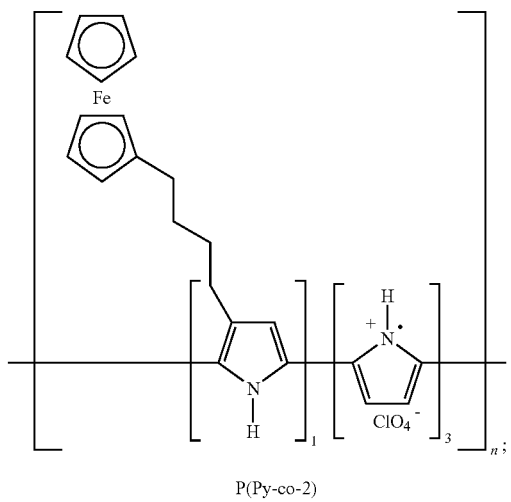

P(Py-co-2)

The co-polymer polypyrrole-co-3-(4-ferrocenylbutyl)pyrrole (PPy-co-2) (formula (VIII) which contains tethered ferrocene groups, could be electrodeposited on a platinum disk electrode of 0.0177 cm$^2$ area by potentiodynamic, potentiostatic, or galvanostatic growth from a dichloromethane solution containing pyrrole (0.01 M), monomer 2 (formula (IX)) (0.01 M), and tetrabutylammonium perchlorate (0.1 M).

Formula (IX)

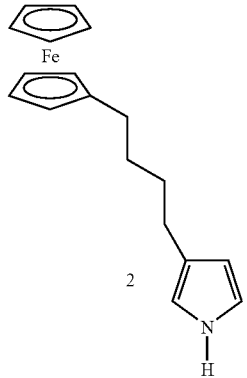

Potentiodynamic growth was performed at 100 mV s$^{-1}$ between −0.8 V and +0.7 V (vs. Ag/AgCl). The cyclic voltamogram of growth displayed the expected increase in current with increasing cycles. Two sets of redox peaks were identified as the polypyrrole and ferrocene redox potentials in the polymer. From the growth cyclic voltammogram a potential of +0.70 V was selected for potentiostatic growth. The chronoamperogram displayed an increasing current over time, after the initial transient, indicating PPy-co-2 growth. The total charge consumed during growth was 100.0 mC. Galvanostatic growth was performed at a current density of 1.0 mA cm$^{-2}$; following the initial transient the potential decreased during polymer growth, indicating the deposited polymer to be conductive. After 5 min, the potential was +0.69 V.

The post-polymerisation cyclic voltammogram of PPy-co-2 in aqueous 1 M NaNO$_3$ displayed redox couples associated with the copolymer backbone and due to the ferrocene moiety.

The potentiostatically grown PPy-co-2 modified platinum electrode was tested by voltammetry in 1.0 M H$_2$SO$_4$ (1:00 mV s$^{-1}$) for hydrogen gas generation. The current-voltage plot shown in FIG. 9(d) indicates the most positive potential for hydrogen generation at this electrode to be 0.00 V, which is similar to that of PPy-FcSO$_3$ (FIG. 9(*b*)) and PPy-co-1 (FIG. 9(*c*)) but quite different to that of the bare platinum electrode (FIG. 9 (a)) or PPy-pTS (FIG. 9(*e*)). Thus, a significant and substantial anodic shift occurred in the most positive potential for hydrogen gas generation at the modified platinum electrode compared to bare platinum. This shift is similar to that achieved by PPy-FcSO$_3$ (FIG. 9 (b)).

Further tests examined the potentiostatic rate of hydrogen generation for the PPy-co-2 modified platinum electrode. These were carried out at a potential of −0.440 V (vs. Ag/AgCl (3 M)NaCl)), which is the same as that used in FIG. 3. As shown in FIG. 10(*d*), a somewhat lesser rate of catalysis is achieved by PPy-co-2 as is achieved by PPy-FcSO$_3$ (FIG. 10(*b*)) under identical circumstances.

The effect of electrochemical area on the rate of hydrogen production was also examined. Cyclic voltammetry (10 mV s$^{-1}$ in 0.1 M K$_4$Fe(CN)$_6$/1.0 M NaNO$_3$) was performed on the PPy-co-2-coated platinum disk electrode and the electrochemical area was established using equation (1) to be 0.0250 cm$^2$. Thus, the current density after 12 h of operation was 15.40 mA cm$^{-2}$, which compares with 26.20 mA cm$^{-2}$ for PPy-FcSO$_3$/Pt, 26.93 mA cm$^{-2}$ for PPy-co-1, 6.66 mA cm$^{-2}$ for PPy-pTS/Pt, and 7.33 mA cm$^{-2}$ for uncoated platinum. The rate of catalysis per unit area of PPy-co-2 is therefore less than that of PPy-FcSO$_3$ under identical circumstances, but still substantially more than bare platinum or Pt/PPy-pTS.

These results indicate that PPy-co-2 displays a similar, but less intense catalysis compared to that exhibited by PPy-FcSO$_3$ and PPy-co-1. The importance of proximity in these systems is illustrated by a comparison of the catalytic performance of the PPy-co-1 and PPy-co-2 coatings. Both contain neutral ferrocene species, but the latter contains a higher local concentration of these moieties. The greater activity of PPy-co-1 is only explicable in terms of proximity. While all of the ferrocene groups in PPy-co-1 are correctly proximate to each other, only some are in PPy-co-2. The binuclear mechanism observed for 1 is again indicated to be operational in these coatings.

The greater activity of PPy-FcSO$_3$ compared to PPy-co-2 is not explicable in terms of the average proximity of their catalytic groups. Both coatings contain roughly the same quantity of ferrocene (on average 1 ferrocene moiety per 4 pyrrole units). However it can be accounted for by the fact that the FcSO$_3^-$ anions are more easily protonated than the neutral ferrocene moieties in PPy-co-2.

Example 4

Comparative Studies Using Closely Related Catalysts which are Likely to be Proximity-Based An uncoated indium tin oxide (ITO) glass electrode dipped in a 1 M HCl solution produced hydrogen gas at potentials more negative than −0.800 V (vs. Ag/AgCl (3 M NaCl).

A polyferrocene of formula III wherein R=R'=CH$_2$; R$_{1-8}$=R$_{1'-8'}$=H and having a average molecular weight ca 790 g mol$^{-1}$ was coated onto a conducting surface of the ITO-glass electrode by slow evaporation of a solution of this material in tetrahydrofuran. The poor solubility of the polyferrocene in acidic aqueous solutions ensured that the coating was not readily lost. The coating effectively concentrated the ferrocene species on the electrode surface but does not use a Statistical Proximity Effect to do this. The polymer effectively served as its own support. Once modified by coating as described, the same electrode was found to evolve hydrogen in the same 1 M HCl solution upon application of potentials more negative than −0.000 V. The coating therefore resulted in a 0.800 V anodic shift in the hydrogen decomposition potential.

This effect is due to the ferrocene moieties contained in the coating of the electrode. It indicates that a wide range of species containing closely proximate ferrocene groups can be used as catalysts for the conversion of H$^+$ to H$_2$. It also indicates that other supports, including a "self-support" or "no support" can be employed in the fabrication of catalysts of the present invention.

Example 5

Statistical Proximity Effects on Other Substrates

The procedure described in Example 1 was applied to the coating of a stainless steel electrode with PPy-FcSO$_3$. In the absence of any coating, the bare stainless steel electrode dipped in a 1 M HCl solution produced hydrogen gas at potentials more negative than −0.560 V (vs. Ag/AgCl (3 M NaCl)). Once modified by coating with PPy-FcSO$_3$, (by potentiostatic growth as described in Example 1), the same electrode was found to evolve hydrogen in the same 1 M HCl solution upon application of potentials more negative than −0.035 V. A 0.525 V anodic shift therefore occurred in the hydrogen decomposition potential.

Similar results have been obtained for this and other proximity-based catalysts using: (i) various carbon substrates, (ii) various iron substrates, (iii) other metallic substrates, such as metallic iridium, (iv) an indium tin oxide (ITO) substrate. Thus, a wide range of substrates can be used to create a statistical proximity catalyst.

Example 6

The Use of Other Supports (NAFION®)

A catalytic group, X$^-$, being a suitable metal salt of its anion Y$^-$ and which is soluble in alcoholic or organic solvents only, is added to a solution of the ion-exchange polymer, NAFION® dissolved in ethanol. The resulting mixture is cast on a metallic substrate and allowed to evaporate to dryness, at which stage a thin layer of NAFION® containing a high concentration of X$^+$ remains. The resulting NAFION® supported X$^+$ is then used as an electrode in an aqueous solution as a catalyst of the reaction:

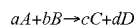

$$aA+bB \rightarrow cC+dD$$

for which X$^+$ is a suitable catalyst only when it is closely and correctly proximate to another molecule X$^+$. As both NAFION® and X$^+$ are not soluble in water, the catalytic groups are not substantially leached or lost during the catalysis and thereafter.

Example 7

The Use of Other Supports (Carbon Paste).

A catalytic group, X$^+$, being a suitable metal salt of its anion Y$^-$ and which is soluble in alcoholic or organic solvents, is added to a carbon paste dispersed in ethanol. The resulting mixture is left to dry within a thin glass tube containing a conducting wire. After evaporating to dryness, the tube is completely filled with conductive carbon particles coated with high concentrations of catalytic group X$^+$. The resulting carbon-supported X$^+$ is then used as an electrode in an aqueous solution as a catalyst of the reaction:

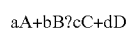

$$aA+bB?cC+dD$$

for which X$^+$ is a suitable catalyst only when it is closely and correctly proximate to another molecule X$^+$. As both the carbon particles and X$^+$ are not soluble in water, the catalytic groups are not substantially leached or lost during the catalysis and thereafter.

Example 8

The Use of a Supramolecular Influence (Ion-Paring) to Favourably Alter the Statistical Likelihood of Catalytic Groups being Suitably Proximate Immediately Prior to, or During Catalysis.

A species $X^+$ is a suitable catalytic group for the reaction

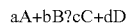

only when it is closely and correctly proximate to another molecule containing X. At a particular concentration Y, only 5% of the $X^+$ ions are correctly proximate to another $X^+$ ion on average. A batch of $X^+$ is therefore chemically altered by the addition of a substituent which changes the overall charge of the catalytic group to $X^-$. The substituent does not affect the catalytic properties of the catalytic group. Using ion-exchange techniques, the original batch of $X^+$ is now combined with the batch of $X^-$, such that the new salt $X^+ X^-$ is formed. On average, 95% of the catalytic groups $X^+$ are now correctly proximate to an $X^-$ at the concentration Y. The resulting mixture is therefore a greatly improved catalyst of the above reaction.

Example 9

The Use of a Supramolecular Influence (Hydrogen Bonding) to Favourably Alter the Statistical Likelihood of Catalytic Groups being Suitably Proximate Immediately Prior to, or During Catalysis.

A neutral species X—H is a suitable catalytic group for the reaction

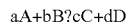

only when it is closely and correctly proximate to another molecule containing X. At a particular concentration Y, only 5% of the X—H molecules are correctly proximate to another X—H molecule on average. A batch of X—H is therefore chemically altered by the addition of an —OH substituent, which is known to form hydrogen bonds with the H-substituent on the original molecule X—H. The —OH functionality does not affect the catalytic properties of X. When the new batch, X—OH, is combined with an equal quantity of the old batch, X—H, hydrogen bonds are formed between X—OH and X—H, giving weakly associated dimers, X—OH . . . H—X in solution. On average, 95% of the catalytic groups X—H are now correctly proximate to an X—OH at the concentration Y. The resulting mixture is therefore a greatly improved catalyst of the above reaction.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

The invention claimed is:

1. An artificial hybrid homogeneous-heterogeneous catalyst for the reaction and/or production of small gaseous molecules, comprising:
   a support substrate;
   first catalytic groups; and
   second catalytic groups,
   wherein said first catalytic groups and said second catalytic groups may be the same or different, wherein at least some of either of said first catalytic groups and second catalytic groups is supported by the support substrate;
   wherein said first catalytic groups and said second catalytic groups are present in a catalytically effective amount when arranged so that at least some of the first catalytic groups are located proximate and oriented relative to the second catalytic groups so that said first and second catalytic groups together provide a catalytic effect for the reaction and/or production of small gaseous molecules,
   wherein the first catalytic groups are not covalently bound to the second catalytic groups within the same molecule;
   wherein the first catalytic groups and the second catalytic groups do not together provide any catalytic effect for the reaction and/or production of small gaseous molecules when dispersed in a homogenous solution; and
   wherein either the product and/or the reactant are a small gaseous molecule.

2. The artificial hybrid homogeneous-heterogeneous catalyst of claim 1, wherein an increase only of X in the number of catalytic groups provided to the support substrate during formation of the catalyst causes an increase of Y in the catalytic effect, where Y is greater than X due to an increase in the likelihood that the catalytic groups are located proximate and oriented relative to one another so as to be catalytically effective.

3. The artificial hybrid homogeneous-heterogeneous catalyst of claim 1, wherein the first catalytic groups and the second catalytic groups facilitate the reaction of one or more reagents thereby providing a catalytic effect and the catalytic effect at a constant concentration M of the one or more reagents is increased by a factor X, wherein X is greater than 1, upon application of conditions, during the formation of the catalyst, which cause a change in the likelihood that catalytic groups will be located proximate and oriented relative to one another so as to be catalytically effective.

4. The artificial hybrid homogeneous-heterogeneous catalyst of claim 3, wherein the conditions are selected from at least one member of the group consisting of:
   the concentration of first and second catalytic groups provided to the support substrate; the polarity of a solute which contacts the support substrate; the acidity of the solute which contacts the support substrate; supramolecular interactions between the catalytic groups; and the temperature of the solute in which the support substrate.

5. The artificial hybrid homogeneous-heterogeneous catalyst of claim 1, wherein the support substrate is a porous framework.

6. The artificial hybrid homogeneous-heterogeneous catalyst of claim 5, wherein the porous framework is a conducting polymer.

7. The artificial hybrid homogeneous-heterogeneous catalyst of claim 6, wherein the conducting polymer is selected from the group consisting of polypyrrole, polyaniline and polythiophene.

8. The artificial hybrid homogeneous-heterogeneous catalyst of claim 1, wherein the first catalytic groups are a ferrocene and the second catalytic groups are a ferrocene.

9. The artificial hybrid homogeneous-heterogeneous catalyst of claim 8, wherein at least one of the ferrocene is substituted with a substituent selected from the group including $C_{3-20}$ alkyl, $C_{3-20}$ acyl, $-SO_3^-$, $-SO_3^{2-}$, $-SO_4^{2-}$ and $-PO_4^{3-}$.

10. The artificial hybrid catalyst of claim 8, wherein the ferrocenes are coated onto the surface of an electrode substrate as part of a polymeric coating.

11. The artificial hybrid catalyst of claim 10, wherein the polymeric coating is a conducting electroactive polymer containing anionic ferrocenes as counter ions.

12. The artificial hybrid homogeneous-heterogeneous catalyst of claim 1, wherein said catalyst comprises a polypyrrole-ferrocene monosulfonate represented by formula (IV)

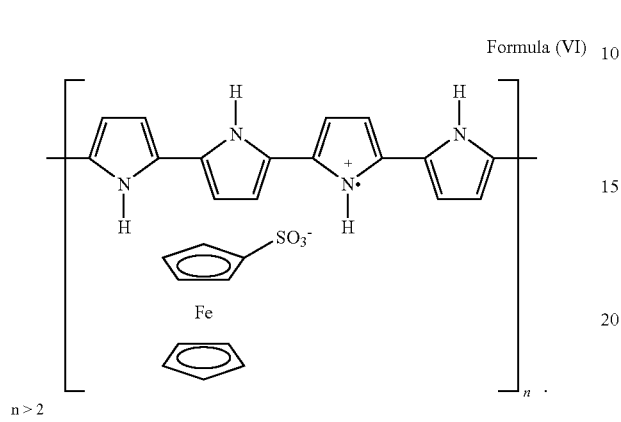

Formula (VI)

$n > 2$

13. The artificial hybrid homogeneous-heterogeneous catalyst of claim 12, wherein said catalyst comprises a polypyrrole-ferrocene represented by formula (IV):

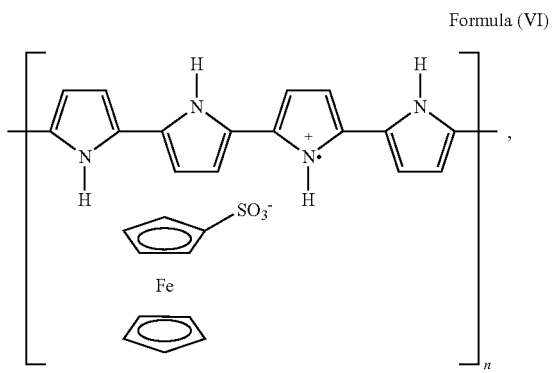

Formula (VI)

$n > 2$ wherein the sulfonate group in Formula (IV) is replaced with a substituent selected from the group consisting of $C_{3-20}$ alkyl, $C_{3-20}$ acyl, $-SO_3^{2-}$, $-SO_4^{2-}$ and $-PO_4^{3-}$.

* * * * *